United States Patent
Gade et al.

(10) Patent No.: US 10,567,923 B2
(45) Date of Patent: Feb. 18, 2020

(54) COMPUTATION SERVICE FOR MOBILE NODES IN A ROADWAY ENVIRONMENT

(71) Applicant: TOYOTA JIDOSHA KABUSHIKI KAISHA, Toyota-shi, Aichi-ken (JP)

(72) Inventors: Shripad Gade, Mountain View, CA (US); Lewis Tseng, Mountain View, CA (US); Kentaro Oguchi, Mountain View, CA (US)

(*) Notice: Subject to any disclaimer, the term of this patent is extended or adjusted under 35 U.S.C. 154(b) by 10 days.

(21) Appl. No.: 15/644,197

(22) Filed: Jul. 7, 2017

(65) Prior Publication Data

US 2019/0014446 A1    Jan. 10, 2019

(51) Int. Cl.
| | |
|---|---|
| *H04B 7/26* | (2006.01) |
| *H04W 4/04* | (2009.01) |
| *H04L 29/08* | (2006.01) |
| *G08G 1/0967* | (2006.01) |
| *H04W 4/80* | (2018.01) |

(52) U.S. Cl.
CPC ...... *H04W 4/046* (2013.01); *G08G 1/096725* (2013.01); *H04B 7/26* (2013.01); *H04L 67/1097* (2013.01); *H04W 4/80* (2018.02)

(58) Field of Classification Search
CPC .. H04W 4/046; H04W 4/80; G08G 1/096725; H04B 7/26; H04L 67/1097; H04L 67/12; H04L 67/18
See application file for complete search history.

(56) References Cited

U.S. PATENT DOCUMENTS

| | | | |
|---|---|---|---|
| 8,705,527 B1* | 4/2014 | Addepalli | H04W 72/0406 370/389 |
| 9,286,800 B2* | 3/2016 | Gordon | G08G 1/09 |
| 9,336,436 B1* | 5/2016 | Dowdall | G08G 1/166 |
| 9,581,997 B1* | 2/2017 | Penilla | G05D 1/0011 |
| 9,602,193 B1* | 3/2017 | Mendelson | G08G 1/14 |
| 2011/0118967 A1* | 5/2011 | Tsuda | B60W 30/10 701/117 |
| 2013/0116859 A1* | 5/2013 | Ihlenburg | G06F 17/00 701/2 |
| 2013/0179056 A1* | 7/2013 | Fukuyama | G08G 1/0112 701/117 |
| 2014/0045556 A1* | 2/2014 | Subramanian | H04W 52/0251 455/574 |

(Continued)

*Primary Examiner* — Wutchung Chu
(74) *Attorney, Agent, or Firm* — Burbage Law, P.C.; Jon-Michael Burbage; Elizabeth Ruzich

(57) ABSTRACT

The disclosure includes embodiments for providing a service to a vehicle via a macro-vehicular cloud. A method, according to some embodiments, is implemented by the vehicle which communicatively coupled to the macro-vehicular cloud via a non-infrastructure network. The macro-vehicular cloud includes a plurality of micro-vehicular clouds which each include a set of onboard vehicle computers that are operable to provide a set of computing resources to the macro-vehicular cloud via the non-infrastructure network. The method includes transmitting, via the non-infrastructure network, a wireless message requesting a merge service from the macro-vehicular cloud. The method includes receiving, via the non-infrastructure network, the merge service from the set of computing resources of the macro-vehicular cloud. The merge service includes the macro-vehicular cloud instructing the vehicle to merge into a lane of a roadway.

20 Claims, 23 Drawing Sheets

(56) References Cited

U.S. PATENT DOCUMENTS

| | | | | |
|---|---|---|---|---|
| 2015/0153176 | A1* | 6/2015 | Lim | G01C 21/26 |
| | | | | 701/408 |
| 2016/0065355 | A1* | 3/2016 | Kenney | H04L 5/16 |
| | | | | 370/276 |
| 2016/0071418 | A1* | 3/2016 | Oshida | G08G 1/22 |
| | | | | 701/23 |
| 2016/0156513 | A1* | 6/2016 | Zhang | H04W 4/70 |
| | | | | 709/220 |
| 2016/0295589 | A1* | 10/2016 | Nikopour | H04W 4/023 |
| 2017/0132922 | A1* | 5/2017 | Gupta | G08G 1/0962 |
| 2017/0190331 | A1* | 7/2017 | Gupta | B60Q 1/346 |
| 2017/0195166 | A1* | 7/2017 | Keerthi | G01C 21/3484 |
| 2018/0046870 | A1* | 2/2018 | Cordell | B60Q 9/008 |
| 2018/0047288 | A1* | 2/2018 | Cordell | B60Q 9/008 |
| 2018/0053413 | A1* | 2/2018 | Patil | G01S 11/14 |
| 2018/0109399 | A1* | 4/2018 | Cardoso de Moura | |
| | | | | H04L 12/4633 |
| 2018/0122234 | A1* | 5/2018 | Nascimento | H04W 4/44 |
| 2018/0141545 | A1* | 5/2018 | Freytag | B62D 15/00 |
| 2018/0146323 | A1* | 5/2018 | Tseng | H04L 67/1097 |
| 2018/0151066 | A1* | 5/2018 | Oba | G08G 1/096725 |
| 2018/0186334 | A1* | 7/2018 | Munafo | G06N 3/0427 |
| 2018/0196443 | A1* | 7/2018 | Bai | H04W 4/046 |
| 2018/0208194 | A1* | 7/2018 | Ihlenburg | G06F 17/00 |
| 2018/0275648 | A1* | 9/2018 | Ramalingam | G05D 1/0027 |

* cited by examiner

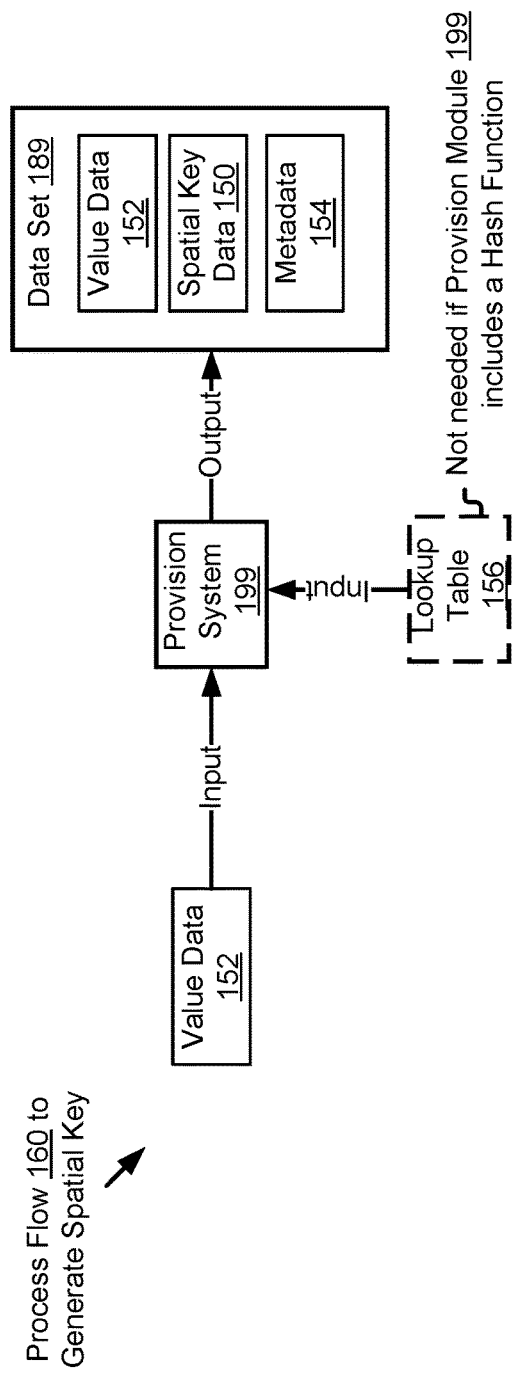
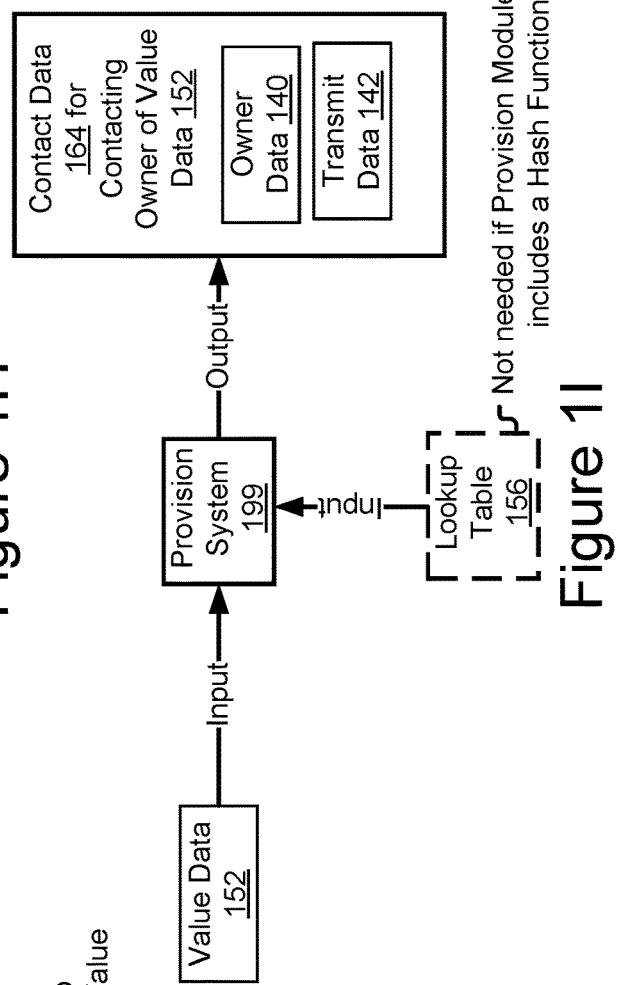

DSRC DATA 195

- Vehicles and other client devices equipped with Dedicated Short Range Communication ("DSRC") transmit a Basic Safety Message ("BSM") at a regular interval.

- Each DSRC message includes the following DSRC data describing one or more of the following for the vehicle that originally sent the DSRC message:
    (1) GPS Data Describing the Location of the Vehicle, where the GPS Data may be so accurate that it describes the specific lane the Vehicle is traveling in;
    (2) Heading Data Describing the Direction of travel for the Vehicle;
    (3) Velocity Data Describing the Velocity of the Vehicle; and
    (4) Path History of Vehicle.

Figure 1J

DSRC DATA 195

Part 1
Vehicle Position Data (local 3D)
- Latitude
- Longitude
- Elevation
- Positional accuracy
- Time Vehicle Motion Data
- Transmission state
- Speed
- Heading
- Steering wheel angle
- Acceleration set (4-way, i.e., 3 axes of acceleration plus yaw rate)
- Brake system status Vehicle Size Data

Part 2
Vehicle Path History
Future Vehicle Path Estimation
Hard Active Braking
Traction Control System active over 100 milliseconds?
Antilock Brake System active over 100 milliseconds?
Light Status
Wiper Status
Vehicle type

Figure 1K

COMPUTATION SERVICE FOR MOBILE NODES IN A ROADWAY ENVIRONMENT

BACKGROUND

The specification relates to providing a computation service for one or more mobile nodes in a roadway environment.

Vehicles may access and use a cloud service. A cloud service involves a vehicle wirelessly communicating with a server via a cellular network. The vehicle may receive data stored on the server or generated by the server executing operations for the vehicle. The vehicle may also store data on the server.

Cloud services that rely on cellular communications are undesirable because they rely on infrastructure such as cellular towers. Infrastructure-dependent wireless communication must establish communication with cellular towers and other infrastructure, and must reply on the communication protocol of this infrastructure, which is frequently designed to favor the needs of the entity that owns this infrastructure and not the needs of the endpoints (e.g., the vehicles) that rely on this infrastructure. The infrastructure itself tends to be out of date and slow relative to the communication capabilities of the endpoints because providing updates to this infrastructure costs money and does not necessarily add to the profits of the corporations that own and operate this infrastructure. As a result, infrastructure-dependent wireless communication is not suitable for modern vehicles that need to be able to access data in real-time or near real-time.

Experience and experimentation also show that infrastructure-dependent wireless communication is not capable of working in in the presence of network partitions. Experience and experimentation also show that infrastructure-dependent wireless communication struggles to maintain communication when endpoints are moving, as vehicles are prone to do.

SUMMARY

The specification relates to providing a computation service for one or more mobile nodes in a roadway environment. In some embodiments, the computation service is a merge solution to assist a merging vehicle to merge from an on ramp into a lane of a roadway included in the roadway environment. Providing the merge solution may be referred to herein as providing a "merge service." In some embodiments, the computation service is made in a distributed fashion among a plurality of on-board vehicle computer systems of a plurality of vehicles which include the provision system described herein.

One general aspect includes a system including: a vehicle communicatively coupled to a macro-vehicular cloud via a non-infrastructure network, where the macro-vehicular cloud includes a plurality of micro-vehicular clouds, where each of the micro-vehicular clouds includes a set of onboard vehicle computers which are operable to provide a set of computing resources to the macro-vehicular cloud via the non-infrastructure network, where the vehicle is a member of a selected micro-vehicular cloud included in the plurality of micro-vehicular clouds so that the vehicle is an element of the macro-vehicular cloud, and where the vehicle is operable to receive a merge service from the set of computing resources of the macro-vehicular cloud via the non-infrastructure network, wherein the merge service includes the macro-vehicular cloud instructing the vehicle to merge into a lane of a roadway. Other embodiments of this aspect include corresponding computer systems, apparatus, and computer programs recorded on one or more computer storage devices, each configured to perform the actions of the methods.

Implementations may include one or more of the following features. The system where the merge service specifying a latitude and longitude where the vehicle should merge into the lane of the roadway and the latitude and longitude are specified with lane-level accuracy. The system where the non-infrastructure network includes a Dedicated Short Range Communication ("DSRC") network which sends and receives messages over a 5.9 gigahertz (GHz) DSRC band and the merge service is requested via a DSRC message. The system where the non-infrastructure network includes a millimeter wave communication network and the merge service is requested via a millimeter wave communication message. The system where the non-infrastructure network includes a full-duplex wireless communication network and the merge service is requested via a full-duplex wireless communication message. The system where each individual micro-vehicular cloud of the plurality of micro-vehicular clouds includes one or more other vehicles and a coordinator, where the one or more other vehicles and the coordinator are communicatively coupled to the non-infrastructure network, where the coordinator of each individual micro-vehicular cloud is communicatively coupled to the macro-vehicular cloud via the non-infrastructure network, and where the vehicle is communicatively coupled to the macro-vehicular cloud via the coordinator of the selected micro-vehicular cloud and the vehicle receives the merge service from the coordinator of the selected micro-vehicular cloud which accesses the computing resources of the macro-vehicular cloud via the non-infrastructure network. The system where the one or more other vehicles are at least momentarily dynamic while the plurality of micro-vehicular clouds are each located at a fixed geographical region which is static and different from the fixed geographical region of the other micro-vehicular clouds included in the plurality of micro-vehicular clouds. The system where the set of onboard vehicle computers are each elements of the one or more other vehicles of the plurality of micro-vehicular clouds. The system where the coordinator is selected from a group that includes the one or more other vehicles and a roadside unit. Implementations of the described techniques may include hardware, a method or process, or computer software on a computer-accessible medium.

One general aspect includes a method implemented by a vehicle communicatively coupled to a macro-vehicular cloud via a non-infrastructure network, where the macro-vehicular cloud includes a plurality of micro-vehicular clouds which each include a set of onboard vehicle computers that are operable to provide a set of computing resources to the macro-vehicular cloud via the non-infrastructure network, the method including: transmitting, via the non-infrastructure network, a wireless message requesting a merge service from the macro-vehicular cloud; and receiving, via the non-infrastructure network, the merge service from the set of computing resources of the macro-vehicular cloud, wherein the merge service includes the macro-vehicular cloud instructing the vehicle to merge into a lane of a roadway. Other embodiments of this aspect include corresponding computer systems, apparatus, and computer programs recorded on one or more computer storage devices, each configured to perform the actions of the methods.

Implementations may include one or more of the following features. The method where the merge service includes specifying a latitude and longitude where the vehicle should merge into the lane of the roadway and the latitude and longitude are specified with lane-level accuracy. The method where the non-infrastructure network includes a DSRC network which sends and receives messages over a 5.9 GHz DSRC band and the merge service is requested via a DSRC message. The method where the non-infrastructure network includes a millimeter wave communication network and the merge service is requested via a millimeter wave communication message. The method where the non-infrastructure network includes a full-duplex wireless communication network and the merge service is requested via a full-duplex wireless communication message. The method where each individual micro-vehicular cloud of the plurality of micro-vehicular clouds includes one or more other vehicles and a coordinator. Implementations of the described techniques may include hardware, a method or process, or computer software on a computer-accessible medium.

One general aspect includes a computer program product including a non-transitory memory of an onboard vehicle computer system of a vehicle communicatively coupled to a macro-vehicular cloud via a non-infrastructure network, where the macro-vehicular cloud includes a plurality of micro-vehicular clouds which each include a set of onboard vehicle computers that are operable to provide a set of computing resources to the macro-vehicular cloud via the non-infrastructure network, where the onboard vehicle computer system stores computer-executable code that, when executed by the onboard vehicle computer system, causes the onboard vehicle computer system to: transmit, via the non-infrastructure network, a wireless message requesting a merge service from the macro-vehicular cloud; and receive, via the non-infrastructure network, the merge service from the set of computing resources of the macro-vehicular cloud, wherein the merge service includes the macro-vehicular cloud instructing the vehicle to merge into a lane of a roadway. Other embodiments of this aspect include corresponding computer systems, apparatus, and computer programs recorded on one or more computer storage devices, each configured to perform the actions of the methods.

Implementations may include one or more of the following features. The computer program product where the service includes specifying a latitude and longitude where the vehicle should merge into the lane of the roadway and the latitude and longitude are specified with lane-level accuracy. The computer program product where each individual micro-vehicular cloud of the plurality of micro-vehicular clouds includes one or more other vehicles and a coordinator. The computer program product the set of onboard vehicle computers are each elements of the one or more other vehicles of the plurality of micro-vehicular clouds. The computer program product where the coordinator of each individual micro-vehicular cloud is operable to control an operation of the set of onboard vehicle computers of the one or more other vehicles included in an individual micro-vehicular cloud which includes the coordinator. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIG. 1H is a block diagram illustrating a process flow for provision system to identify a spatial key according to some embodiments.

FIG. 1I is a block diagram illustrating a process flow for provision system to identify an owner of a value and data for contacting the owner of the value according to some embodiments.

FIG. 1J is a block diagram illustrating Dedicated Short Range Communication data ("DSRC data") including path history data for a vehicle according to some embodiments.

FIG. 1K is a block diagram illustrating DSRC data according to some embodiments.

DETAILED DESCRIPTION

Figure 1A:
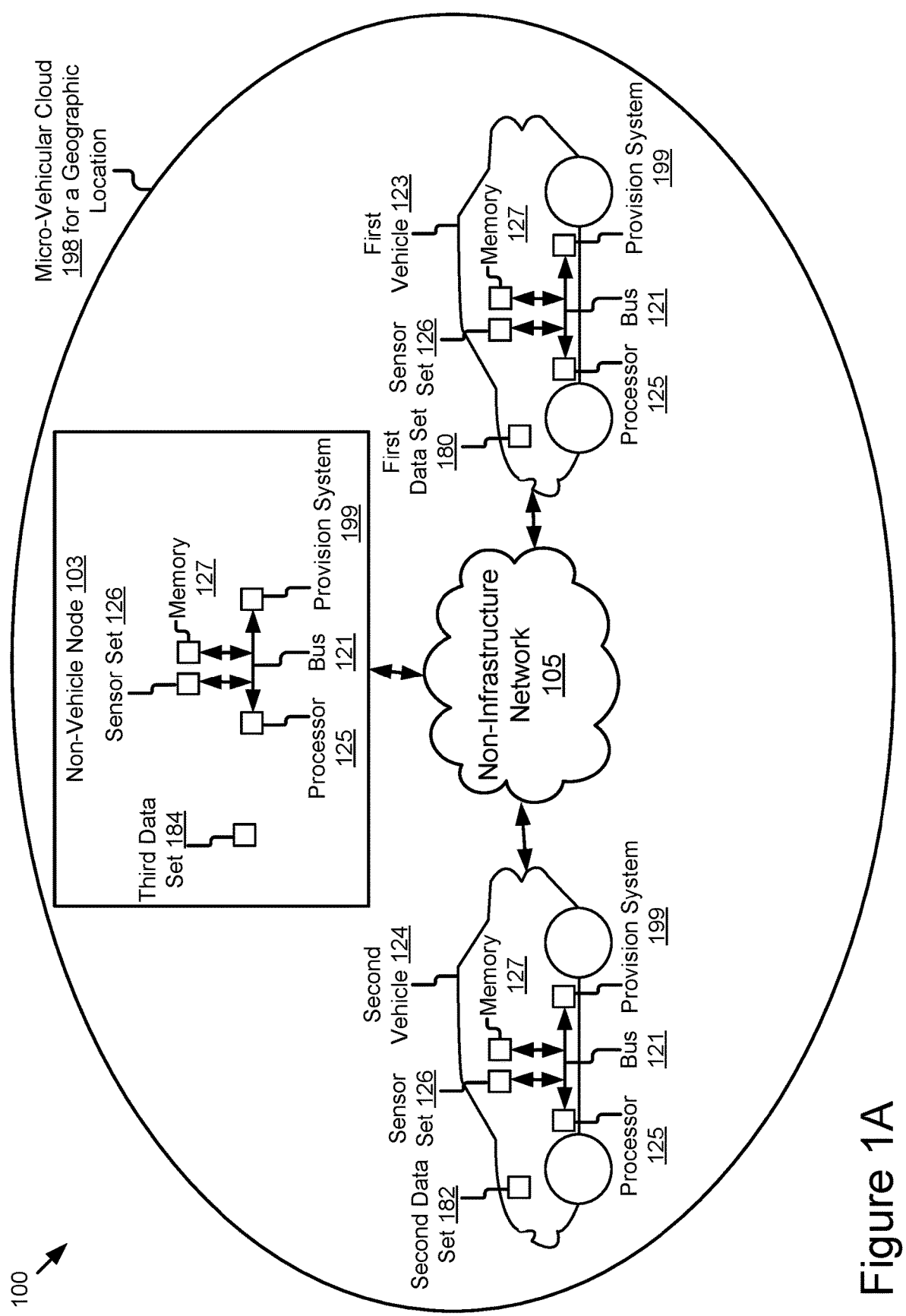
FIG. 1A is a block diagram illustrating an operating environment for a micro-vehicular cloud according to some embodiments.

A roadway region is a portion of a roadway environment. For example, an intersection may be a first roadway region, an on-ramp may be a second roadway region and stop sign may be a third roadway region. Any other discrete portion of a roadway environment may be a roadway region.

Described herein is a micro-vehicular cloud. A micro-vehicular cloud includes a plurality of mobile nodes that each include a provision system as described herein. Also described herein is a macro-vehicular cloud. A macro-vehicular cloud includes a plurality of micro-vehicular clouds which are each communicatively coupled to one another via a non-infrastructure network.

A mobile node is any processor-based computing device that is present in a roadway environment and capable of moving by itself or while present in or on some other object that is itself movable. For example, one or more of the following processor-based computing devices may be a mobile node: a vehicle; a smartphone on a human user present in a vehicle; and a smart device (e.g., a smart watch, a fitness tracker, smart headphones, etc.) on a human user present in a vehicle.

Two or more mobile nodes may each include a provision system. These two or more mobile nodes form a micro-vehicular cloud if: (1) they are present in the same roadway region; and (2) are communicatively coupled, or capable of communicatively coupling, to one another via a non-infrastructure-based network.

An example of a non-infrastructure-based network is two vehicles that wirelessly communicate with each other via Dedicated Short Range Communication ("DSRC"), millimeter wave ("mmWave") communication or full-duplex wireless communication (as described in U.S. patent application Ser. No. 14/471,387 filed on Aug. 28, 2014 and entitled "Full-Duplex Coordination System," the entirety of which is herein incorporated by reference).

Compared with existing solutions, the micro-vehicular cloud described herein has the following example benefits: (1) it does not need infrastructure [e.g., network towers, servers, server farms, etc.]; (2) it supports real-time or substantially real-time data retrieval [e.g., among two or more different mobile nodes as described herein]; (3) it supports real-time or substantially real-time data writing [e.g., among two or more different mobile nodes as described herein]; (4) it works correctly in the presence of one or more network partitions [e.g., the presence of a network partition from the perspective of one mobile node does not prevent that mobile node from writing or reading data in real-time or substantially real time]; (5) it works when one or more of the mobile nodes are in motion at roadway speeds [e.g., a mobile node is moving at 0.1 to 85.0 miles per hour]; and (6) it enables vehicles to form a macro-vehicular cloud, which further enables vehicles to access the computing resources of other vehicles in other roadway regions without the drawbacks of using a infrastructure-dependent network.

A provision system described herein may provide a computation service. The computation service may include, for example, helping a vehicle to merge onto a lane of a roadway (i.e., a "merge service"). The merge service is described below with reference FIGS. 6A-6H, 7 and 8.

In some embodiments, the provision system includes a merge module. In some embodiments, the functionality of the merge module is provided in a distributed fashion across multiple vehicles which include their own instances of the provision system.

Referring now to FIG. 1A, depicted is a block diagram illustrating an operating environment 100 for a micro-vehicular cloud 198 according to some embodiments. The operating environment 100 is present in a roadway region so that each of the elements of the operating environment 100 is present in the same roadway region.

The operating environment 100 includes one or more of the following elements: a first vehicle 123; a second vehicle 124 and a non-vehicle node 103. These elements of the operating environment 100 may be communicatively coupled to one another via a non-infrastructure network 105. These elements of the operating environment 100 are depicted by way of illustration. In practice, the operating environment 100 may include one or more first vehicles 123, one or more second vehicles 124 and one or more non-vehicle nodes 103. The operating environment 100 may also include zero of the first vehicle 123, the second vehicle 124 or the non-vehicle nodes 103 so long as at least two of these elements are present to form a micro-vehicular cloud as described herein.

A micro-vehicular cloud 198 includes any two devices selected from the operating environment 100, of the same or different kind, which each include a provision system 199 and wirelessly communicate with one another to form a non-infrastructure network 105 to read and write data among themselves as described herein. As depicted, the micro-vehicular cloud 198 includes the first vehicle 123, the second vehicle 124, the non-vehicle node 103 and the non-infrastructure network 105.

In the depicted embodiment, the first vehicle 123, the second vehicle 124 and the non-vehicle node 103 include similar elements. For example, each of these elements of the operating environment 100 include their own provision system 199, memory 127, bus 121, processor 125 and sensor set 126. These elements of the first vehicle 123, the second vehicle 124 and the non-vehicle node 103 provide the same or similar functionality relative to one another.

In the depicted embodiment, the first vehicle 123, the second vehicle 124 and the non-vehicle node 103 each store different data sets. For example, the first vehicle 123 includes a first data set 180, the second vehicle 124 includes a second data set 182 and the non-vehicle node 103 includes a third data set 184. The first data set 180 is stored on the memory 127 of the first vehicle 123, the second data set 182 is stored on the memory 127 of the second vehicle 124 and the third data set 184 is stored on the memory 127 of the non-vehicle node 103.

The non-infrastructure network 105 (herein, the "the network 105") may be any conventional wireless network that does not include infrastructure such as cellular towers, servers or server farms. In some embodiments, the network 105 includes Bluetooth® communication networks for sending and receiving data including via one or more of DSRC, mmWave, full-duplex wireless communication and any other type of wireless communication that does not include infrastructure elements. The network 105 may include vehicle-to-vehicle communication such as a Wi-Fi™ network shared among two or more vehicles 123.

The network 105 specifically does not include a mobile data network including third-generation (3G), fourth-generation (4G), fifth-generation (5G), long-term evolution (LTE), Voice-over-LTE ("VoLTE") or any other mobile data network that relies on infrastructure such as cellular towers, hardware servers or server farms.

The first vehicle 123 includes a car, a truck, a sports utility vehicle, a bus, a semi-truck, a drone or any other roadway-based conveyance. In some embodiments, the first vehicle 123 is an autonomous vehicle or a semi-autonomous vehicle.

In some embodiments, the first vehicle 123 is a connected vehicle. For example, the first vehicle 123 is communicatively coupled to the network 105 and can send and receive messages via the network 105, and this quality may make the first vehicle 123 a "connected vehicle."

The second vehicle 124 may be similar to the first vehicle 123, and so, that description will not be repeated here.

The non-vehicle node 103 may include any processor-based computing device that is present in a roadway environment, includes the provision system 199 and is not a vehicle such as the first vehicle 123 or the second vehicle 124. In some embodiments, the non-vehicle node 103 is one of the following: a smartphone; a laptop; a personal computer; a tablet computer; and a smart watch or some other smart device such as a fitness tracker, smart headphones, health monitoring device, etc. The non-vehicle node 103 is communicatively coupled to the network 105 and can send and receive messages via the network 105.

The first vehicle 123, the second vehicle 124 and the non-vehicle node 103 may each include one or more of the following elements: a processor 125; a sensor set 126; a memory 127 and a provision system 199. These elements may be communicatively coupled to one another via a bus 121. The memory 127 may store data or information. For example, the memory 127 of the first vehicle 123 stores the first data set 180, the memory 127 of the second vehicle 124 stores the second data set 182 and the memory of the non-vehicle node 103 stores the third data set 184.

The elements common to the first vehicle 123, the second vehicle 124 and the non-vehicle node 103 are now described.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. Although FIG. 1A includes a single processor 125 present in the first vehicle 123, the second vehicle 124 or the non-vehicle node 103, multiple processors may be included in one or more of these elements of the operating environment 100. The processor 125 may include a graphical processing unit. Other processors, operating systems, sensors, displays, and physical configurations may be possible.

In some embodiments, the processor 125 may be an element of a processor-based computing device of the first vehicle 123 or the second vehicle 123. For example, the first vehicle 123 may include one or more of the following processor-based computing devices and the processor 125 may be an element of one of these devices: an onboard vehicle computer; an electronic control unit; a navigation system; an advanced driver assistance system ("ADAS system") and a head unit.

In some embodiments, the sensor set 126 may include one or more sensors. The sensor set 126 may collect sensor data. The sensor data may describe, for example, a physical environment of the roadway environment which is external to the first vehicle 123, the second vehicle 124 of the non-vehicle node 103. For example, the sensor set 126 may include one or more external sensors that measure the physical environment external to one or more of the first vehicle 123, the second vehicle 124 or the non-vehicle node 103.

In some embodiments, the sensor set 126 may record a physical environment internal to the first vehicle 123 or the second vehicle 124. For example, the sensor set 126 may include one or more internal sensors that monitor and measure the actions of the driver of one or more of the first vehicle 123 and the second vehicle 124.

In some embodiments, the sensor set 126 may include one or more sensors that are operable to measure the physical environment outside one or more of the first vehicle 123, the second vehicle 124 and the non-vehicle node 103. For example, the sensor set 126 may record one or more physical characteristics of the physical environment that is proximate to one or more of the first vehicle 123, the second vehicle 124 and the non-vehicle node 103.

In some embodiments, the sensor set 126 may include one or more sensors that are operable to measure the physical environment inside a cabin of one or more of the first vehicle 123 and the second vehicle 124. For example, the sensor set 126 may record an eye gaze of the driver (e.g., using an internal camera), where the driver's hands are located (e.g., using an internal camera) and whether the driver is touching a head unit or infotainment system with their hands (e.g., using a feedback loop from the head unit or infotainment system that indicates whether the buttons, knobs or screen of these devices is being engaged by the driver).

In some embodiments, the sensor set 126 may include one or more of the following sensors: an altimeter; a gyroscope; a proximity sensor; a microphone; a microphone array; an accelerometer; a camera (internal or external); a LIDAR sensor; a laser altimeter; a navigation sensor (e.g., a global positioning system sensor of the DSRC-compliant GPS unit); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The sensor set 126 may be operable to record sensor data that describes one or more locations of a device (e.g., one or more of the first vehicle 123, the second vehicle 124 of the non-vehicle node 103) at one or more different times, images or other measurements of the roadway environment and objects or other vehicles present in the roadway environment such as pedestrians, animals, traffic signs, traffic lights, pot holes, etc.

The roadway environment may include a roadway region that is proximate to one or more of the first vehicle 123, the second vehicle 124 and the non-vehicle node 103. For example, the first vehicle 123 may be in motion on a roadway and the roadway environment may include one or more vehicles that are in front of the first vehicle 123, behind the first vehicle 123, beside the first vehicle 123 or one or more car lengths away from the first vehicle 123. The sensor data may describe measurable aspects of the roadway environment.

In some embodiments, the sensor data may describe an event present in the roadway environment. The event may be any roadway condition that causes roadway congestion, is an indication of roadway congestion or is a result of roadway congestion. The event may also include an opening between two objects of the roadway environment which is big enough for a vehicle (e.g., the first vehicle 123 or the second vehicle 124) to enter or pass through without causing a collision or nearly causing a collision.

The memory 127 may include a non-transitory storage medium. The memory 127 may store instructions or data that may be executed by the processor 125. The instructions or data may include code for performing the techniques described herein. The memory 127 may be a dynamic random access memory (DRAM) device, a static random access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the memory 127 may store any or all of the data described below with reference to FIGS. 1D-1K, 2, 3 and 4.

The provision system 199 may include code and routines that are operable, when executed by the processor 125, to cause the processor 125 to execute a write command responsive to receiving a write message or execute a read command responsive to receiving a read message. The functionality of the provision system 199 is described in more detail below with reference to FIGS. 1B-1K and 2-5.

The first vehicle 123, second vehicle 124 and the non-vehicle node 103 each include a communication unit. The communication unit is described in more detail below with reference to the communication unit 245 of FIG. 2.

The communication unit may include a Dedicated Short Range Communication ("DSRC") unit including a DSRC receiver and a DSRC transceiver which enable the first vehicle 123, the second vehicle 123 and the non-vehicle node 103 to send and receive wireless messages via the DSRC protocol ("DSRC messages"). A device that includes a DSRC unit and may send and receive DSRC messages is referred to herein as being DSRC-enabled.

In some embodiments, the first vehicle 123, the second vehicle 124 and the non-vehicle node 103 are each DSRC-enabled. In this way, the first vehicle 123, the second vehicle 124 and the non-vehicle node 103 may send and receive DSRC messages to one another. For example, any of the read messages, write messages or the acknowledgement messages described herein may be DSRC messages.

In some embodiments, one or more of the first vehicle 123, the second vehicle 124 and the non-vehicle node 103 may include a full-duplex coordination system as described in U.S. patent application Ser. No. 14/471,387 filed on Aug. 28, 2014 and entitled "Full-Duplex Coordination System." In this way, one or more of these elements of the operating environment 100 may transmit full-duplex wireless messages to one another. For example, any of the read messages, write messages or the acknowledgement messages described herein may be full-duplex wireless messages.

In some embodiments, one or more of the communication units of the first vehicle 123, the second vehicle 124 and the non-vehicle node 103 may include a mmWave communication transceiver and receiver. In this way, one or more of these elements of the operating environment 100 may transmit mmWave messages to one another. For example, any of the read messages, write messages or the acknowledgement messages described herein may be mmWave messages.

In some embodiments, the provision system 199 of one or more of the first vehicle 123, the second vehicle 124 and the non-vehicle node 103 may be implemented using hardware including a field-programmable gate array ("FPGA") or an application-specific integrated circuit ("ASIC"). In some other embodiments, the provision system 199 of one or more of the first vehicle 123, the second vehicle 124 and the non-vehicle node 103 may be implemented using a combination of hardware and software.

In some embodiments, the wireless messages described herein may be encrypted themselves or transmitted via an encrypted communication provided by the network 105. In some embodiments, the network 105 may include an encrypted virtual private network tunnel ("VPN tunnel") that does not include any infrastructure components such as network towers, hardware servers or server farms. In some embodiments, the provision system 199 of one or more of the first vehicle 123, the second vehicle 124 and the non-vehicle node 103 may include encryption keys for encrypting wireless messages and decrypting the wireless messages described herein.

Figure 1B:
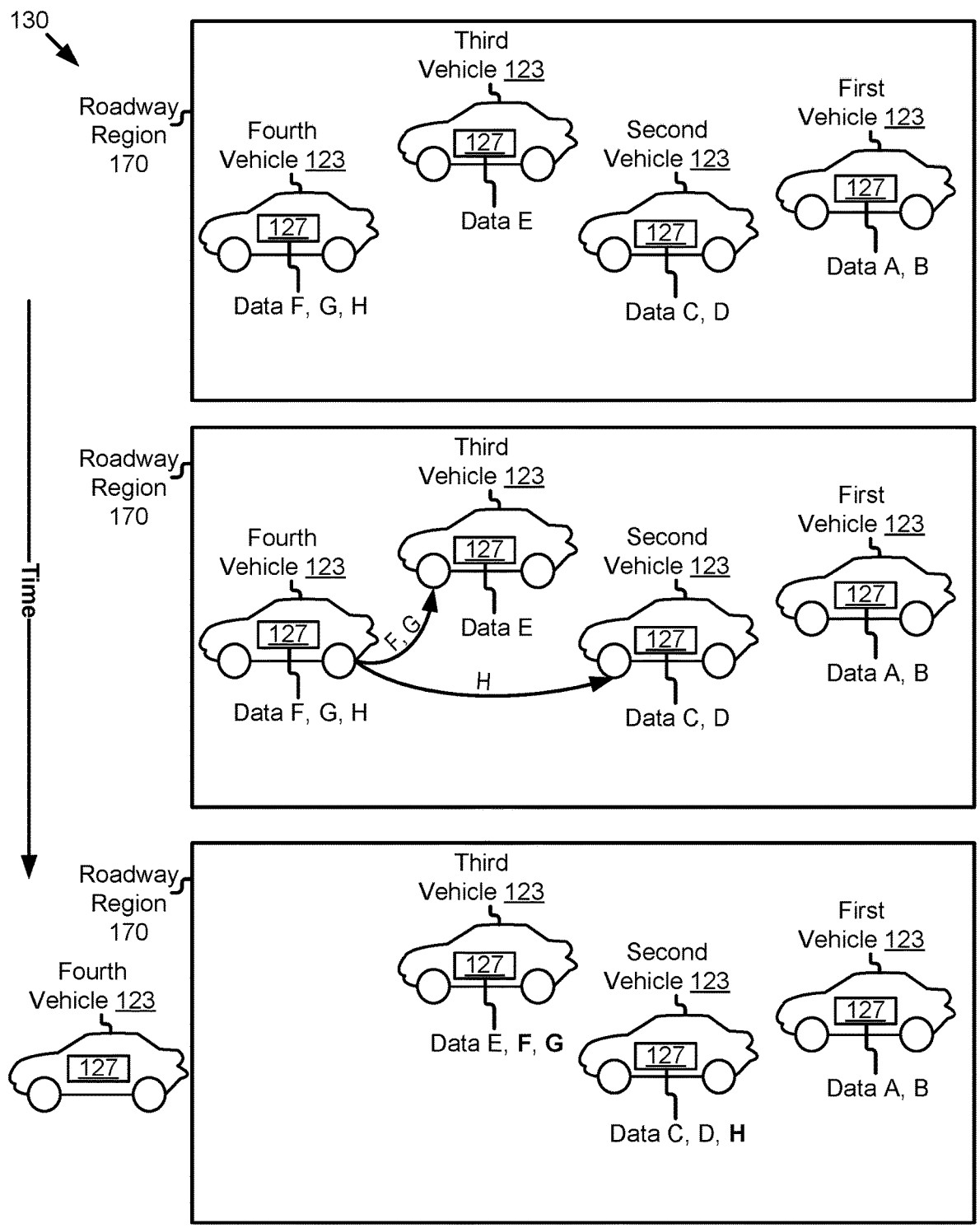
FIG. 1B is a block diagram illustrating a process flow for the operation of a micro-vehicular cloud formed by a plurality of vehicles of a same roadway region each including a provision system according to some embodiments.

Referring now to FIG. 1B, depicted is a block diagram illustrating a process flow 130 for the operation of a micro-vehicular cloud formed by a plurality of vehicles 123 of a same roadway region 170, each including a provision system 199 according to some embodiments. The provision systems 199 included in the priority of vehicles 123 are not depicted in FIG. 1B. One or more of the plurality of vehicles 123 are in motion. For example, they may be traveling on a roadway at highway speeds (e.g., 55 miles per hour).

The process flow 130 is depicted so that the same roadway region 170 is depicted three times in FIG. 1B, with the roadway region 170 depicted at the top of FIG. 1B occurring earliest in time, the roadway region 170 depicted in the middle of FIG. 1B occurring second in time and the roadway region 170 depicted at the bottom of FIG. 1B occurring third in time.

The roadway region 170 occurring earliest in time includes the following elements: a first vehicle 123; a second vehicle 123; a third vehicle 123; and a fourth vehicle 123. Each of the first vehicle 123, the second vehicle 123, the third vehicle 123 and the fourth vehicle 123 include a memory 127, each memory 127 storing data so that the collective data of the roadway region 170 is stored in a distributed fashion.

The first vehicle 123 in the depicted roadway region 170 occurring earliest in time includes "Data A" and "Data B." The second vehicle 123 in the depicted roadway region 170 occurring earliest in time includes "Data C" and "Data D." The third vehicle 123 in the depicted roadway region 170 occurring earliest in time includes "Data E." The fourth vehicle 123 in the depicted roadway region 170 occurring earliest in time includes "Data F," "Data G" and "Data F."

Referring now to the depicted roadway region 170 occurring second in time, the provision system 199 of the fourth vehicle 123 determines, based on the heading and path history of the fourth vehicle 123, that the fourth vehicle 123 is leaving the roadway region 170. Accordingly, the provision system 199 of the fourth vehicle 123 determines that "Data F," "Data G" and "Data H" will be transmitted to other vehicles of the roadway region 170. The provision system 199 of the fourth vehicle 123 transits, via the network 105, "Data F" and "Data G" to the third vehicle 123. The provision system 199 of the fourth vehicle 123 transits, via the network 105, "Data H" to the second vehicle 123.

In some embodiments, the plurality of vehicles 123 each store a lookup table that describes, among other things, an identifier (e.g., a node ID) of each of the vehicles 123 included in the roadway region 170 and the data stored by each vehicle 123 included in the roadway region 170. The provision system 199 of the fourth vehicle 123 (or some other vehicle 123 included in the plurality that is a coordinator of the plurality, as described in more detail below with reference to FIGS. 1C and 1D) updates the lookup table to indicate the new storage location of "Data F," "Data G" and "Data H." The provision system 199 transmits data, via the network 105, to the other vehicles 123 of the plurality included in the roadway region 170; this data describes the changes to the lookup table or includes a new copy of the lookup table as modified to reflect the changes described above.

Referring now to the depicted roadway region 170 occurring third in time, the fourth vehicle 123 has left the roadway region 170 and is now not a member of the plurality of vehicles 123 for this roadway region.

Figure 1C:
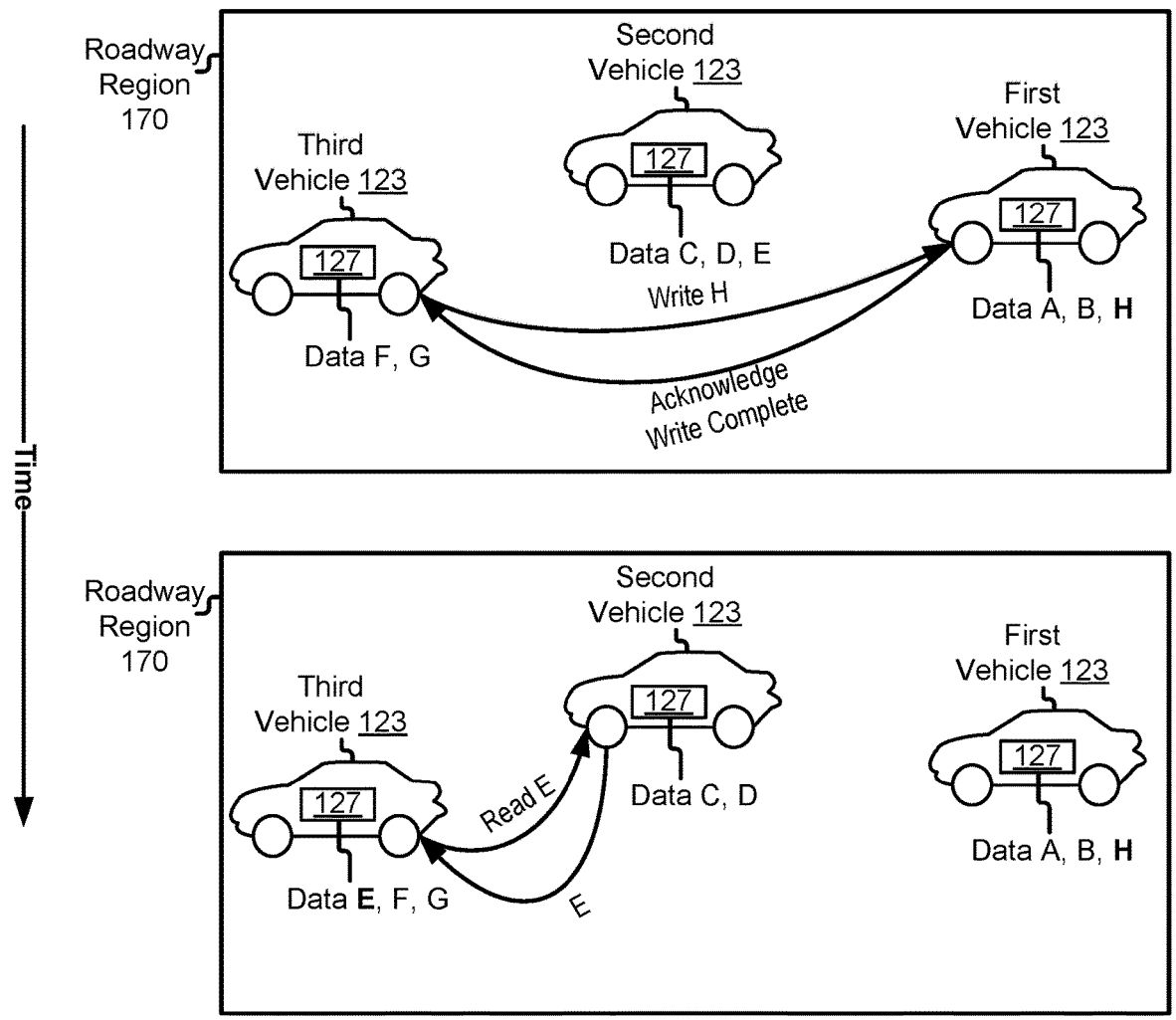
FIG. 1C is a block diagram illustrating a process flow for a write command and a read command executed among a plurality of provision systems of a same roadway region according to some embodiments.

Referring now to FIG. 1C, depicted is a block diagram illustrating a process flow 132 for a write command and a read command executed among a plurality of provision systems 199 of a same roadway region 170 according to some embodiments. As with FIG. 1B, the provision systems 199 of the plurality of vehicles 123 are not depicted in FIG. 1C.

FIG. 1C is shows a same roadway region 170 over a period of time. The roadway region 170 depicted at the top of FIG. 1C occurs earliest in time. The roadway region 170 depicted at the bottom of FIG. 1C occurs second in time relative to the roadway region 170 depicted above it.

The roadway region 170 occurring earliest in time includes the following elements: a first vehicle 123; a second vehicle 123; and a third vehicle 123. Each of the first vehicle 123, the second vehicle 123 and the third vehicle 123 include a memory 127, each memory 127 storing data so that the collective data of the roadway region 170 is stored in a distributed fashion.

The first vehicle 123 in the depicted roadway region 170 occurring earliest in time includes "Data A" and "Data B." The second vehicle 123 in the depicted roadway region 170 occurring earliest in time includes "Data C," "Data D" and "Data E." The third vehicle 123 in the depicted roadway region 170 occurring earliest in time includes "Data F," "Data G" and "Data H."

The provision system 199 of the third vehicle 123 transmits a write message to the first vehicle 123 indicated that Data H" is to be stored in the first vehicle 123.

For example, the third vehicle 123 may be a coordinator. The coordinator is the vehicle within a specific roadway region 170 which determines which mobile node included in the roadway region 170 stores which data. As the third vehicle 123 is the coordinator of this particular roadway region 170 in this example, the provision system 199 of the third vehicle 123 may receive "Data H" from some other node and then determine that "Data H" is to be stored by the memory 127 the first vehicle 123, and so, the provision system 199 of the third vehicle 123 may transmit the write message (including a write command) to the first vehicle 123 via the network 105. A provision system 199 of the first vehicle 123 stores "Data H" in a memory 127 of the first vehicle 123 and transmits an acknowledgement message to the third vehicle 123 indicating that the write operation is completed so that "Data H" is stored by the first vehicle 123.

In some embodiments, a coordinator for a particular roadway region is a roadside unit ("RSU") included in that roadway region. As such, a device which performs the function of a "coordinator" may also be referred to as a "coordinator" since this device is not a vehicle in some embodiments.

In some embodiments, as described below with reference to FIGS. 6A-6H, 7 and 8, the coordinator for a particular roadway region has additional responsibilities relating to a macro-vehicular cloud. For example, a coordinator manages communications among a plurality of micro-vehicular clouds 198 of a macro-vehicular cloud and controls the operations of the onboard vehicle computers of the vehicles included in each micro-vehicular clouds 198 of the plurality of micro-vehicular clouds so that these onboard vehicle computers provide themselves as a computing resource to other vehicles which are included in the macro-vehicular cloud.

For example, a particular vehicle of a micro-vehicular cloud may request that data be stored in a non-transitory memory of another device which is located in a different geographic region than the particular vehicle. The coordinator for the micro-vehicular cloud which includes the particular vehicle is responsible for receiving the request, identifying a "Nth" micro-vehicular cloud which corresponds with the geographic region and coordinating with the coordinator for the "Nth" micro-vehicular cloud to ensure that the data is stored in a non-transitory memory of a vehicle or non-vehicle node of "Nth" micro-vehicular cloud so that this data can be retrieved by the particular vehicle when it is next present in the geographic region which includes the "Nth" micro-vehicular cloud.

In another example, a particular vehicle of a micro-vehicular cloud may request that one or more computing operations be executed. The coordinator for the micro-vehicular cloud which includes the particular vehicle is responsible for receiving the request, identifying the computing resources necessary for executing the computing operations and provisioning computing resources among the onboard vehicle computers of the macro-vehicular cloud so that these computing operations are executed for the particular vehicle and any data which is yielded by these executions are provided to the particular vehicle.

Referring now to the depicted roadway region 170 occurring second in time, the provision system 199 of the third vehicle 123 determines that "Data E" is to be stored by the memory 127 of the third vehicle 123. The provision system 199 of the third vehicle 123 transmits, via the network 105, a read message indicating that "Data E" is to be stored by the third vehicle 123. The provision system 199 of the second vehicle 123 receives the read message and transmits a response message to the third vehicle 123 that includes "Data E." The provision system 199 of the third vehicle 123 stores "Data E" on the memory 127 of the third vehicle 123.

Figure 1D:
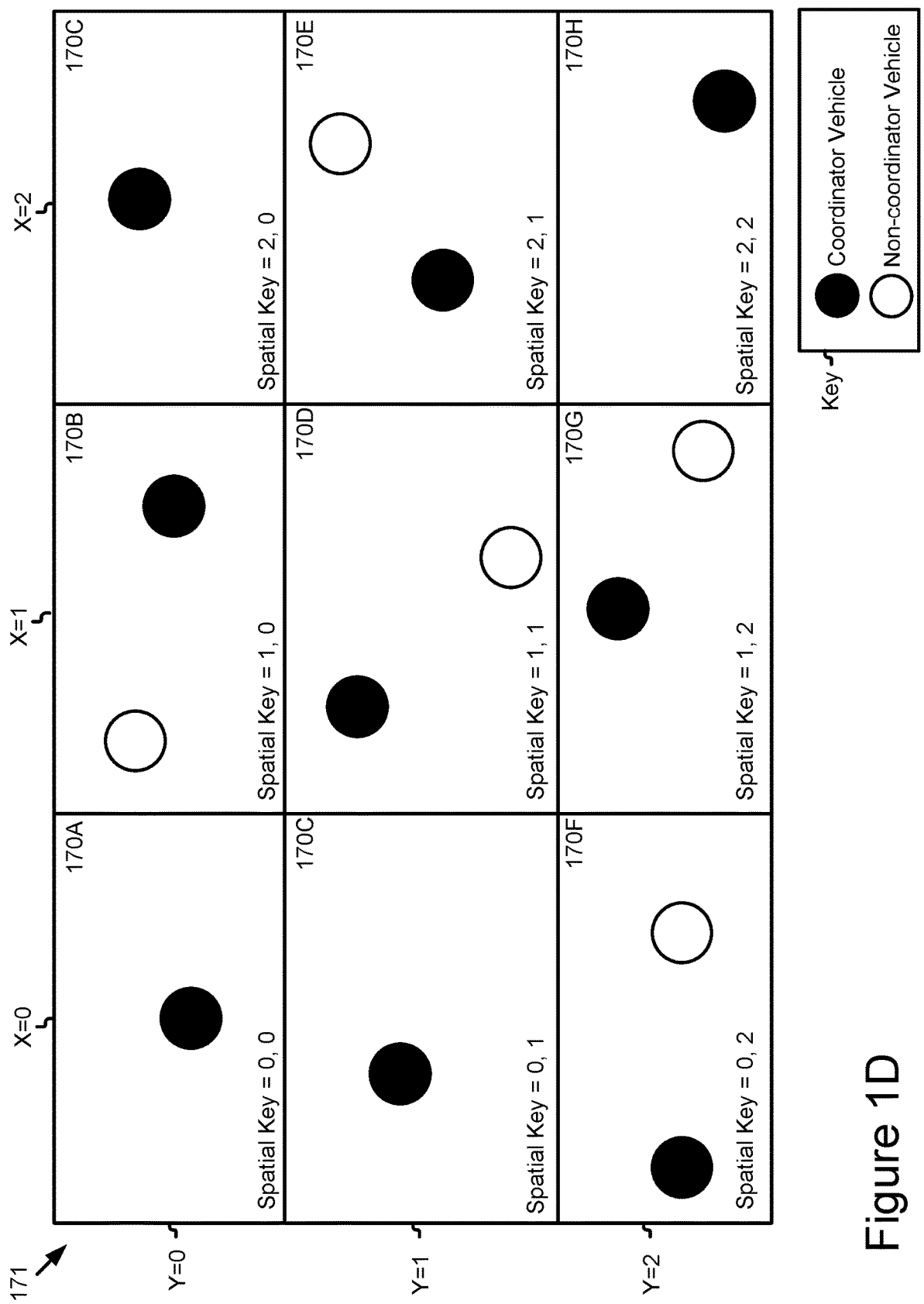
FIG. 1D is a block diagram illustrating an example of a roadway area and spatial keys for a plurality of roadway regions according to some embodiments.

Referring now to FIG. 1D, depicted is a block diagram illustrating an example of a roadway area 171 and spatial keys for a plurality of roadway regions 170A-H included in the roadway area 171 according to some embodiments.

A roadway area 171 includes a roadway and areas proximate to the roadway. For example, a roadway area includes a portion of an interstate highway and area that is proximate to the interstate highway such as on-ramps, exit ramps, breakdown lanes, parking lots, gas stations, fast-food restaurants, hotels, motels, etc. In one embodiment, the roadway area may include a defined region such a 5 mile portion of the roadway (or some other positive range that includes the roadway) and an area that is 100 yards in direction of the defined region (or some other positive range that includes the area that is proximate to the roadway).

A grid is assigned to a roadway area 171. As depicted, the grid is three-by-three, but in practice the grid can be other sizes. As depicted, each block of the grid is a separate roadway region 170A-H. The roadway regions 170A-H can be the same size as one another or different sizes.

In some embodiments, the grid and the roadway regions 170A-H are predetermined at design time. For example, at design time a roadway area 171 is divided into different roadway regions 170 using a grid or some other system or dividing the roadway areas into known roadway regions.

In some embodiments, each roadway region 170A-H is assigned a spatial key. For example, the roadway region 170A is assigned a spatial key equal to [0, 0] and the roadway region 170F is assigned a spatial key [0, 2]. Other spatial keys are depicted in FIG. 1D. Each roadway region includes a coordinator (or, in some embodiments, a coordinator node since a coordinator for a particular roadway region may include a non-vehicle node 103). The coordinator for a particular roadway region manages the data storage for that roadway region, manages the execution of operations for that roadway region, maintains the cloud data (see, e.g., FIG. 2 and cloud data 287) and performs other tasks which are described below for methods 300, 400, 700, 900 depicted in FIGS. 3, 4, 7 and 9, respectively. The spatial keys for the different roadway regions are assigned in advance and stored in a lookup table or some other data structure. The lookup table also identifies the coordinator for each roadway region and data describing how to contact that coordinator via the network 105. In some embodiments, each coordinator stores the lookup table in their memory 127 so that each coordinator knows the spatial keys, the coordinators for the different roadway regions and how to contact the different coordinators. In some embodiments, each mobile node of the roadway area 171, whether they be a coordinator or not, stores the lookup table in their memory 127. The lookup table is described in more detail below with reference to FIG. 1G.

As described in more detail below with reference to FIGS. 3, 4 and 5, a non-coordinator (or non-coordinator node) for a roadway region may initiate communication with a mobile node of another roadway region by initiating that communication through the coordinator (or coordinator node) for their own roadway region. Coordinators (or coordinator nodes) of different roadway regions directly communication with one another via the network 105. However, coordinators (or coordinator nodes) do not directly communicate with non-coordinators (or non-coordinator nodes) of different roadway regions. For example, if a coordinator of a first roadway region (e.g., the roadway region 170F assigned spatial key 0, 2) wants to read or write data with a different roadway region (e.g., the roadway region 170C assigned spatial key 2,0), then the coordinator for first roadway region may communicate with a third roadway region (e.g., the roadway region 170D assigned spatial key 1, 1) who then relays that message to the coordinator for the second roadway region. The coordinator for the second roadway region then processes the read or write request as described below with reference to one or more of FIGS. 3, 4 and 5.

In some embodiments, the spatial key for a particular embodiment region may include a latitude and a longitude of a center point (or approximate center point) of that roadway region. In other embodiments, the spatial keys may be assigned using unique identifiers or some other construct.

Figure 1E:
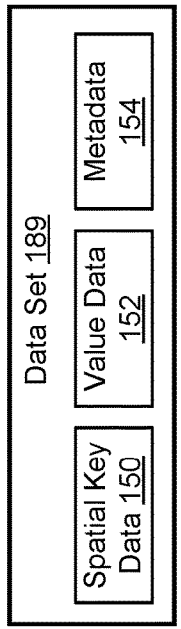
FIG. 1E is a block diagram of a data set configured to be read, written, stored or transmitted by a provision system according to some embodiments.

Referring now to FIG. 1E, depicted is a block diagram of a data set 189 configured to be read, written, stored or transmitted by a provision system 199 according to some embodiments.

The data set 189 may include a spatial key data 150, value data 152 and metadata 154.

In some embodiments, the spatial key data 150 may include data that identifies where a particular value data 152 is stored. The value data 152 describes a value. The metadata 154 includes data that is associated with the value, the owner of the value or the requester of a command in relation to the value. The owner of the value is the mobile node that stores the value or will be storing the value after the conclusion of a present write command (or the processing of a write message). The requester is the mobile node that is transmitting either a write message (wrote command) or a read message (read command) in relation to the value (e.g., write this value to your memory as in FIG. 4, or read this value from your memory and transmit it to me as in FIG. 3).

In some embodiments, each of the data sets (e.g., the first data 180, the second data 182, the third data 184 and "Data A" through "Data H") may include elements that are similar to the data set 189. For example, all data sets 180 that are read, written, stored or transmitted by the provision system 199 may include a spatial key data 150, its own value data 152 and its own metadata 154.

Figure 1F:
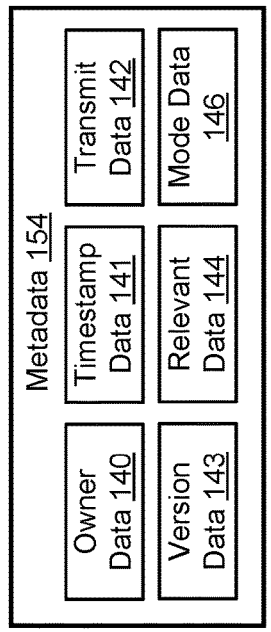
FIG. 1F is a block diagram of metadata configured to be read, written, stored or transmitted by a provision system according to some embodiments.

Referring now to FIG. 1F, depicted is a block diagram of metadata 154 configured to be read, written, stored or transmitted by a provision system 199 according to some embodiments.

The metadata 154 includes one or more of the following elements: owner data 140; timestamp data 141; transmit data 142; version data 143; relevant data 144; and mode data 146.

The owner data 140 describes which mobile node within a particular roadway region 170 owns an instance of value data 152. This is the mobile node whose memory 127 stores a particular instance of value data 152. In some embodiments, the memory 127 of a particular mobile node may store one or more different instances of value data 152.

The timestamp data 141 describes one or more timestamps associated with any of the data included in the data set 189. For example, the timestamp data 141 may describe a time when a mobile node was at a certain geographic location, a time when a particular mobile node was assigned ownership of a particular instance of value data 152, a time when a transmission occurred, a time when a mobile node entered a roadway region or left a roadway region, etc.

The transmit data 142 describes how to communicate with a particular mobile node. For example, the transmit data 142 may specify, for a particular mobile node, what non-infrastructure-based wireless communication capabilities it has and any information needed to successfully communicate with it via different wireless communication types. The transmit data 142 may describe how to communicate with an owner of a particular instance of value data 152.

The version data 143 identifies a version value or number for a particular instance of value data 152.

The relevant data 144 describes any digital data that is relevant to a particular instance of value data 152. For example, the relevant data 144 may include DSRC data that is relevant to a particular data set 189 or instance of value data 152. DSRC data is described in more detail below with reference to FIGS. 1J and 1K.

The mode data 146 describes a propagation mode (or other user-tunable parameters) for propagating data or distributing data within a roadway region or a roadway area. For example, the mode data 146 may describe how value data 152 or data sets 189 are propagated in a particular roadway region (i.e., propagation data) or distributed within a particular roadway region (i.e., distribution data).

Figure 1G:
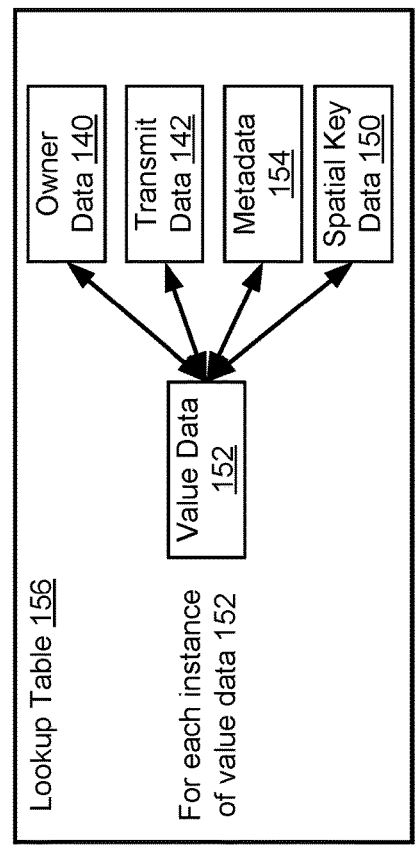
FIG. 1G is a block diagram of a lookup table configured to be read, written, stored, transmitted other otherwise utilized by a provision system according to some embodiments.

Referring now to FIG. 1G, depicted is a block diagram of a lookup table 156 configured to be read, written, stored, transmitted or otherwise utilized by a provision system 199 according to some embodiments.

For each instance of value data 152, the lookup table 156 describes one or more of the following: (1) the owner data 140 for that instance of value data 152; (2) the transmit data 142 for the owner described by the owner data 140; (3) metadata 154 for that instance of value data 152; and (4) the spatial key data 150 for that instance of value data 152.

The lookup table 156 may include a plurality of instances of value data 152. The lookup table 156 may be some other data construct other than a lookup table.

Referring now to FIG. 1H, depicted is a block diagram illustrating a process flow 160 for provision system 199 to identify an instance of spatial key data 150 according to some embodiments.

In some embodiments, the provision system 199 includes a hash function that is encoded so that it is operable to output the correct spatial key data 150 for an instance of a value data 152 if the instance of value data 152 is provided to it as an input. The hash function is also operable to output the metadata 154 for a particular instance of value data 152 if provided that instance of value data 152 as an input. The hash function is also operable to output a data set 189 for the instance of value data 152 that includes the instance of value data 152, the correct spatial key data 150 for that instance of value data 152 and the correct metadata 154 for that instance of value data 152.

In some embodiments, the provision system 199 does not include the hash function and instead uses the lookup table 156 to generate the outputs described above.

Referring now to FIG. 1I, depicted is a block diagram illustrating a process flow 162 for provision system to identify an owner of a value and data for contacting the owner of the value according to some embodiments.

For example, the provision system 199 includes a hash function that is encoded so that it is operable to receive an instance of value data 152 as an input and output owner data 140 and transmit data 142 that accurately describe the owner for that instance of value data 152 and how to communicate with that owner. This data may be stored together as contact data 164 which is outputted by the provision system 199.

In some embodiments, the provision system 199 does not include the hash function and instead uses the lookup table 156 to generate the outputs described above.

Referring now to FIG. 1J, depicted is a block diagram illustrating DSRC data including path history data for a mobile node according to some embodiments.

As described above, a mobile node may transmit a DSRC message. The DSRC message may include one or more of a conventional DSRC message, a DSRC probe, or Basic Safety Message ("BSM" if singular, or "BSMs" if plural).

The regular interval for transmitting BSMs is user configurable. In some implementations, a default setting for this interval is transmitting the BSM every 0.10 seconds or substantially every 0.10 seconds. A BSM is broadcasted over the 5.9 GHz DSRC band.

The range for transmitting DSRC messages is substantially 1,000 meters. In some implementations, DSRC range is a range of substantially 100 meters to substantially 1,000 meters.

Referring now to FIG. 1K, depicted is a block diagram illustrating DSRC data 195 according to some embodiments.

Each DSRC message, regardless of type, may include any or all of the DSRC data 195. In some implementations, the DSRC data 195 is an element of the metadata for a particular data set 189.

A DSRC message may include two parts. These two parts may include different DSRC data 195 as shown in FIG. 1K.

Part 1 of the DSRC data 195 may describe one or more of the following: vehicle position; vehicle heading; vehicle speed; vehicle acceleration; vehicle steering wheel angle; and vehicle size.

Part 2 of the DSRC data 195 may include a variable set of data elements drawn from a list of optional elements. Some of the DSRC data 195 included in Part 2 of the DSRC message are selected based on event triggers, e.g., anti-locking brake system ("ABS") being activated may trigger DSRC data 195 relevant to the ABS system of the vehicle.

In some implementations, some of the elements of Part 2 are transmitted less frequently in order to conserve bandwidth.

In some implementations, the DSRC data 195 included in a DSRC message includes current snapshots of a vehicle traveling along a roadway system.

In some embodiments, the DSRC data 195 is an example of the "local state data" described below with reference to FIG. 7. For example, a coordinator of a micro-vehicular cloud aggregates local state data for their group by aggregating the DSRC data 195 received from the vehicles which are members of the micro-vehicular cloud which they coordinate. See, for example, step 709 of FIG. 7. The coordinator may then share this aggregated local state data with other coordinators for other micro-vehicular clouds as described, for example, with reference to step 711 of FIG. 7.

Figure 2:
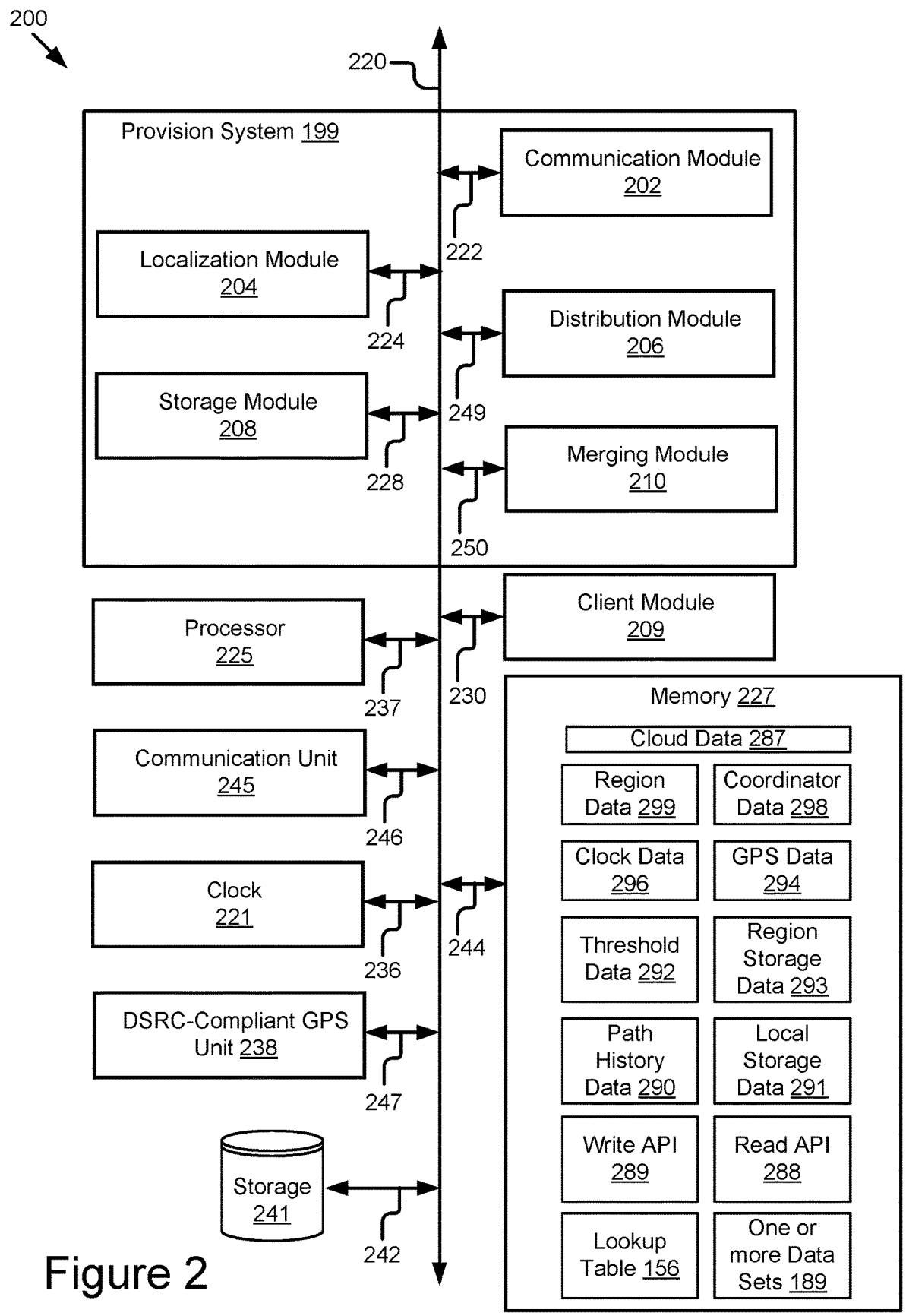
FIG. 2 is a block diagram illustrating an example computer system including a provision system according to some embodiments.

Referring now to FIG. 2, depicted is a block diagram illustrating an example computer system 200 including a provision system 199 according to some embodiments.

In some embodiments, the computer system 200 may include a special-purpose computer system that is programmed to perform one or more steps of the methods 300, 400, 700, 900 described below with reference to FIGS. 3, 4, 7 and 9.

In some embodiments, the computer system 200 may include a processor-based computing device. For example, the computer system 200 may include an onboard vehicle computer system of the first vehicle 123 or the second vehicle 124; the computer system 200 may also include the non-vehicle node 103.

The computer system 200 may include one or more of the following elements according to some examples: the provision system 199; a processor 225; a communication unit 245; a clock 221; a DSRC-compliant GPS unit 238; a storage 241; a memory 227; and a client module 209. The components of the computer system 200 are communicatively coupled by a bus 220.

In the illustrated embodiment, the processor 225 is communicatively coupled to the bus 220 via a signal line 237. The communication unit 245 is communicatively coupled to the bus 220 via a signal line 246. The clock 221 is communicatively coupled to the bus 220 via a signal line 236. The DSRC-compliant GPS unit 238 is communicatively coupled to the bus 220 via a signal line 247. The storage 241 is communicatively coupled to the bus 220 via a signal line 242. The memory 227 is communicatively coupled to the bus 220 via a signal line 244. The client module 209 is communicatively coupled to the bus 220 via a signal line 230.

The processor 225 includes an arithmetic logic unit, a microprocessor, a general-purpose controller, or some other processor array to perform computations and provide electronic display signals to a display device. The processor 225 processes data signals and may include various computing architectures including a CISC architecture, a RISC architecture, or an architecture implementing a combination of instruction sets. Although FIG. 2 includes a single processor 225, multiple processors may be included. The processor 225 may include a graphical processing unit. Other processors, operating systems, sensors, displays, and physical configurations may be possible.

The communication unit 245 may include hardware that transmits and receives data to and from the network 105. In some embodiments, the communication unit 245 includes a port for direct physical connection to the network 105 or to another communication channel. For example, the communication unit 245 includes a USB, SD, CAT-5, or similar port for wired communication with the network 105. In some embodiments, the communication unit 245 includes a wireless transceiver for exchanging data with the network 105 or other communication channels using one or more wireless communication methods, including Bluetooth, DSRC, mmWave, full-duplex wireless communication or another suitable wireless communication method which does not include or rely on infrastructure elements such as cellular towers, hardware servers or server farms.

In some embodiments, the communication unit 245 includes a wireless transceiver for exchanging data with the network 105 or other communication channels using one or more wireless communication methods, including: Bluetooth, EN ISO 14906:2004 Electronic Fee Collection—Application interface EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); mmWave communication; the communication method described in U.S. patent application Ser. No. 14/471,387 filed on Aug. 28, 2014 and entitled "Full-Duplex Coordination System"; or another suitable wireless communication method.

In some embodiments, the communication unit 245 does not include a cellular communications transceiver for sending and receiving data over a cellular communications network including via WAP, e-mail, or another type of electronic communication that rely on cellular infrastructure, hardware servers or server farms.

In some embodiments, the communication unit 245 includes a DSRC transceiver and a DSRC receiver.

In some embodiments, the communication unit 245 includes a mmWave transceiver and a mmWave receiver.

In some embodiments, the communication unit 245 includes full-duplex coordination system as described in U.S. patent application Ser. No. 14/471,387 filed on Aug. 28, 2014 and entitled "Full-Duplex Coordination System."

The clock 221 includes a software, hardware or a combination of hardware and software that is configured to monitor the passage of time.

In some embodiments, the clocks 221 of a plurality of computer systems 200 are synchronized so that they each monitor the passage of time in synchronization with one another. In this way, for any point in time, the clock 221 of a first vehicle 123 and the clock 221 of a second vehicle 124 may each indicate the same time or substantially the same time.

The clock 221 generates clock data 296 that describes the time measured by the clock 221. The clock data 296 is stored on the memory 227.

In some embodiments, the clock 221 also generates timestamps and other data related to time that is stored in the memory 227. For example, some of the DSRC data 195 (which is stored in the memory 227, although not depicted as such in FIG. 2) may be generated by the clock 221 and stored in the memory 227 as elements of the DSRC data 195.

A DSRC-compliant GPS unit 238 is operable to provide GPS data 294 describing the location of computer system 200 with lane-level accuracy. For example, the computer system 200 is an element of a vehicle such as the first vehicle 123 or the second vehicle 123, or a non-vehicle node 103 traveling in a vehicle on a roadway. Lane level accuracy means that the location of the vehicle is described so accurately that the vehicle's lane of travel may be accurately determined. In the context of the provision system 199, lane level accuracy enables the provision system 199 to more accurately determine which roadway region the vehicle is located in and when the vehicle is leaving the roadway region to enter a different roadway region as depicted in FIG. 1B.

In some embodiments, the DSRC-compliant GPS unit 238 includes hardware that wirelessly communicates with a GPS satellite to retrieve GPS data 294 that describes a location of the computer system 200 with a precision that is compliant with the DSRC standard. The DSRC standard requires that GPS data 294 be precise enough to infer if two computer systems 200 (which are elements of different vehicles) are in the same lane at the same time. The lane may be a lane of a roadway. In some embodiments, the DSRC-compliant GPS unit 238 is operable to identify, monitor and track its two-dimensional position within 1.5 meters of its actual position 68% of the time under an open sky. Since lanes of a roadway are typically no less than 3 meters wide, whenever the two-dimensional error of the GPS data 294 is less than 1.5 meters the provision system 199 described herein may analyze the GPS data 294 provided by the DSRC-compliant GPS unit 238 and determine what lane of the roadway the computer system 200 is traveling in based on the relative positions of two or more different computer systems 200 on the roadway at the same time.

By comparison to the DSRC-compliant GPS unit 238, a conventional GPS unit which is not compliant with the DSRC standard is unable to determine the location of a computer system 200 with lane-level accuracy. For example, a typical lane of a roadway is approximately 3 meters wide. However, a conventional GPS unit only has an accuracy of plus or minus 10 meters relative to the actual location of the computer system 200. As a result, such conventional GPS units are not sufficiently accurate for use by the provision system 199 since they would not accurately reflect the roadway region where the computer system 200 is located, and eventually result in a computer system 200 leaving a roadway region without distributing the one or more data sets 189 stored on its memory 127 to the other computer systems 200 of the roadway region as depicted in FIG. 1B. This would break the micro-vehicular cloud described herein so that is not sufficiently reliable for acceptance by human users of the micro-vehicular cloud.

The client module 209 includes an application or system of the computer system 200 that may make requests for one or more data sets 189 to be read or written. For example, the client module 209 may include one or more of the following: an electronic control unit; a navigation system; an ADAS system; an infotainment system; and a head unit. The client module 209 may include any system, subsystem or software application of a first vehicle 123, a second vehicle 124 or a non-vehicle node 103, depending on whether the computer system 200 is an element of the first vehicle 123, the second vehicle 124 or the non-vehicle node 103, respectively.

The memory 227 stores instructions or data that may be executed by the processor 225. The instructions or data may include code for performing the techniques described herein. The memory 227 may be a DRAM device, a SRAM device, flash memory, or some other memory device. In some embodiments, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

Although not depicted in FIG. 2, the memory 227 may store any or all of the data described below with reference to FIGS. 1D-1K, 3, 4, 6A-6H, 7 and 8.

As illustrated in FIG. 2, the memory 227 stores one or more of the following elements: cloud data 287; region data 299; coordinator data 298; clock data 296; GPS data 294; threshold data 292; region storage data 293; path history data 290; local storage data 291; write application programming interface ("API") 289; read API 288; one or more data sets 189; and the lookup table 156. The data set 189 and the lookup table 156 is described above with reference to FIGS. 1E, 1F, 1G, 1H, 1J and 1K, and so, those descriptions will not be repeated here.

The cloud data 287 includes digital data that describes statistical information about the computing resources that are historically available for different micro-vehicular clouds at different times of day and days of the week. For example, a macro-vehicular cloud (see, e.g., FIGS. 6A and 6B) includes a plurality of micro-vehicular cloud 198. A roadway region 170 is a fixed geographical region having its own micro-vehicular cloud 198. A particular roadway region 170 itself is static, but the mobile nodes within the particular roadway region 170 changes in identity (i.e., the particular vehicles included in the roadway region 170) and volume (i.e., the number of vehicles present in the roadway region) over time. The cloud data 287 describes this variation for different roadway regions 170 (i.e., different micro-vehicular clouds 198) so that the cloud data 287 describes a statistical estimate of the computing resources available for each micro-vehicular cloud 198 at different times of day and days of week.

The region data 299 includes digital data that describes the one or more roadway regions 170 for a roadway area (or a plurality of roadway areas). The region data 299 may also describe the spatial keys for the different roadway regions. The region data 299 may describe which mobile nodes are present in each different roadway region.

The coordinator data 298 is digital data that describes who the coordinator or coordinator node is for each of the different roadway regions described by the region data 299. The coordinator data 298 may also describe how data is distributed in each of these roadway regions and/or how data is propagated within these different roadway regions. The coordinator data 298 may describe how to contact each of the different coordinators (e.g., coordinators or coordinator nodes) for the different roadway regions (e.g., the mode of communication and any data necessary to successfully communicate with the coordinator).

In some embodiments, the coordinator data 298 may identify a particular computer system 200 as the coordinator or coordinator node for that particular roadway region. The other mobile nodes of this particular roadway region may know the identity of the coordinator or coordinator node for that particular roadway region so that they follow any read or write commands provided to them by their assigned coordinator.

In some embodiments, a particular computer system 200 is assigned the role of coordinator for a roadway region at random by the computer system 200 itself or coordinator with the other computer systems 200 located within that roadway region. In some embodiments, a particular computer system 200 is assigned the role of coordinator based on one or more rational factors such as: relative computing power of the different computer systems 200 in the roadway region with the most computing power being favored; available memory space of the different computer systems 200 in the roadway region with the most available memory space being favored; and likelihood that a particular computer system 200 will be present in the roadway region the longest amount of time relative to the other computer systems 200 of that roadway region, with the longest amount of time being favored.

The clock data 296 includes digital data describing the current time or the passage of time.

The GPS data 294 includes digital data describing the DSRC-compliant GPS coordinate for the computer system 200.

The threshold data 292 describes a threshold which indicates when a data synchronization event occurs or when a computer system 200 is determined to be leaving a roadway region.

For example, the threshold data 292 for a data synchronization event may be determined by the distribution module 206 at time intervals described by the threshold data 292 and measured against the clock data 296. In this way, a data synchronization event occurs at regular time intervals. The data synchronization event is described in more detail below with reference to the methods 300, 400 of FIGS. 3 and 4.

In another example, the threshold data 292 for a data synchronization event may be determined by the distribution module 206 whenever the GPS data 294 for the computer system 200 indicates that a geographical threshold described by the threshold data 292 is met In another example, the threshold data 292 for a computer system 200 to distribute their data sets 189 belonging to the roadway region are distributed to the other mobile nodes of the roadway region based on the distribution module 206 determining that the GPS data 294 for the computer system 200 indicates that a geographical threshold described by the threshold data 292 is met. See, for example, FIG. 1B.

The region storage data 293 identifies which mobile nodes are present in a particular roadway region in which the computer system 200 is present and which data sets 189 are stored on these mobile nodes. For example, the region storage data 293 may describe which values are stored at which mobile nodes of a particular roadway region. In some embodiments, only the coordinator for a particular roadway region has the region storage data 293 for that particular roadway region.

The path history data 290 describes a series of DSRC-compliant GPS coordinates for the computer system 200 and times when the computer system 200 was present at each of these DSRC-compliant GPS coordinates.

The local storage data 291 describes, for a particular computer system 200, which data sets 189 are stored on its local memory 227. The local storage data 291 may describe, for example, identifiers of the values stored by the memory 227 in the one or more data sets 189 of the memory 227.

The write API 289 includes any data necessary to transmit a successful write message or write command to another provision system 199 of another computer system 200.

The read API 288 includes any data necessary to transmit a successful read message or read command to another provision system 199 of another computer system 200.

The memory 227 may store one or more data sets 189 such as was described above with reference to FIGS. 1E, 1F, 1G, 1J and 1K.

The storage 241 can be a non-transitory storage medium that stores data for providing the functionality described herein. The storage 241 may be a DRAM device, a SRAM device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment shown in FIG. 2, the provision system 199 includes a communication module 202, a localization module 204, a distribution module 206 and a storage module 208. These components of the provision system 199 are communicatively coupled to each other via the bus 220.

The communication module 202 can be software including routines for handling communications between the provision system 199 and other components of the computer system 200. In some embodiments, the communication module 202 can be a set of instructions executable by the processor 225 to provide the functionality described below for handling communications between the provision system 199 and other components of the computer system 200. In some embodiments, the communication module 202 can be stored in the memory 227 of the computer system 200 and can be accessible and executable by the processor 225. The communication module 202 may be adapted for cooperation and communication with the processor 225 and other components of the computer system 200 via signal line 222.

The communication module 202 sends and receives data, via the communication unit 245, to and from one or more elements of the operating environment 100 or a roadway area 171. For example, the communication module 202 sends and receives write messages, read messages or acknowledgement messages.

In some embodiments, the communication module 202 receives data from components of the provision system 199 and stores the data in one or more of the storage 241 and the memory 227.

In some embodiments, the communication module 202 may handle communications between components of the provision system 199 or the computer system 200.

The localization module 204 can be software including routines for tracking the GPS data 294 over time (as described by the clock data 296) and generating the path history data 290.

In some embodiments, the localization module 204 can be stored in the memory 227 of the computer system 200 and can be accessible and executable by the processor 225. The localization module 204 may be adapted for cooperation and communication with the processor 225 and other components of the computer system 200 via signal line 224.

The distribution module 206 can be software including routines for (1) generating and maintaining the lookup table 156 and (2) generating and maintaining the region storage data 293 and the local storage data 291 which collectively describe where different sets of data 189 are stored within the roadway region to which the computer system 200 belongs. In some embodiments, the region storage data 293 and the local storage data 291 are elements of the lookup table 156. In some embodiments, the distribution module 206 may be operable to receive inputs (e.g., a particular instance of value data 152) and then output data for that input as described above with reference to FIGS. 1H and 1L.

The distribution module 206 may also include the hash function described above with reference to FIGS. 1H and 1L. In some embodiments, the distribution module 206 may maintain the hash function so that it operates correctly.

In some embodiments, the hash function included in the distribution module 206 is operable to output the spatial key data 150 that corresponds to a particular instance of value data 152 that is provided to the distribution module 206 as an input. These instances of value data 152 may be received as read messages or write messages via one or more of the communication module 202 and the communication unit 245.

In some embodiments, the distribution module 206 may generate messages in response to one or more read messages or write messages. For example, the distribution module 206 may generate one or more of the responses described below with reference to FIGS. 3, 4 and 5. These read or write messages may be transmitted by the client module 209 or another mobile node.

In some embodiments, the distribution module 206 may instruct the storage module 208 to read data from the memory 227 or write data to the memory 227. For example, the distribution module 206 may instruct the storage module 208 to read from the memory 227 responsive to a read message or write data to the memory 227 responsive to a write message.

In some embodiments, the distribution module 206 may be operable, when executed by the processor 225, to cause the processor 225 to execute one or more of the steps described below with reference to methods 300, 400 of FIGS. 3 and 4.

In some embodiments, the distribution module 206 can be stored in the memory 227 of the computer system 200 and can be accessible and executable by the processor 225. The distribution module 206 may be adapted for cooperation and communication with the processor 225 and other components of the computer system 200 via signal line 249.

The storage module 208 can be software including routines for reading data from the memory 227 or writing data to the memory 227 as instructed by the distribution module 206. The storage module 208 may manage the operation of the memory 227 and the storage 241. The storage module 208 may also manage the operation of a distributed storage system (not pictured) via one or more of the communication module 202 and the communication unit 245.

In some embodiments, the storage module 208 can be stored in the memory 227 of the computer system 200 and can be accessible and executable by the processor 225. The storage module 208 may be adapted for cooperation and communication with the processor 225 and other components of the computer system 200 via signal line 228.

The merge module 210 can be software including routines for executing one or more steps of the method 700 or the method 900 described below with reference to FIGS. 6A-6H, 7, 8 and 9.

In some embodiments, the merge module 210 can be stored in the memory 227 of the computer system 200 and can be accessible and executable by the processor 225. The merge module 210 may be adapted for cooperation and communication with the processor 225 and other components of the computer system 200 via signal line 250.

Figure 3:
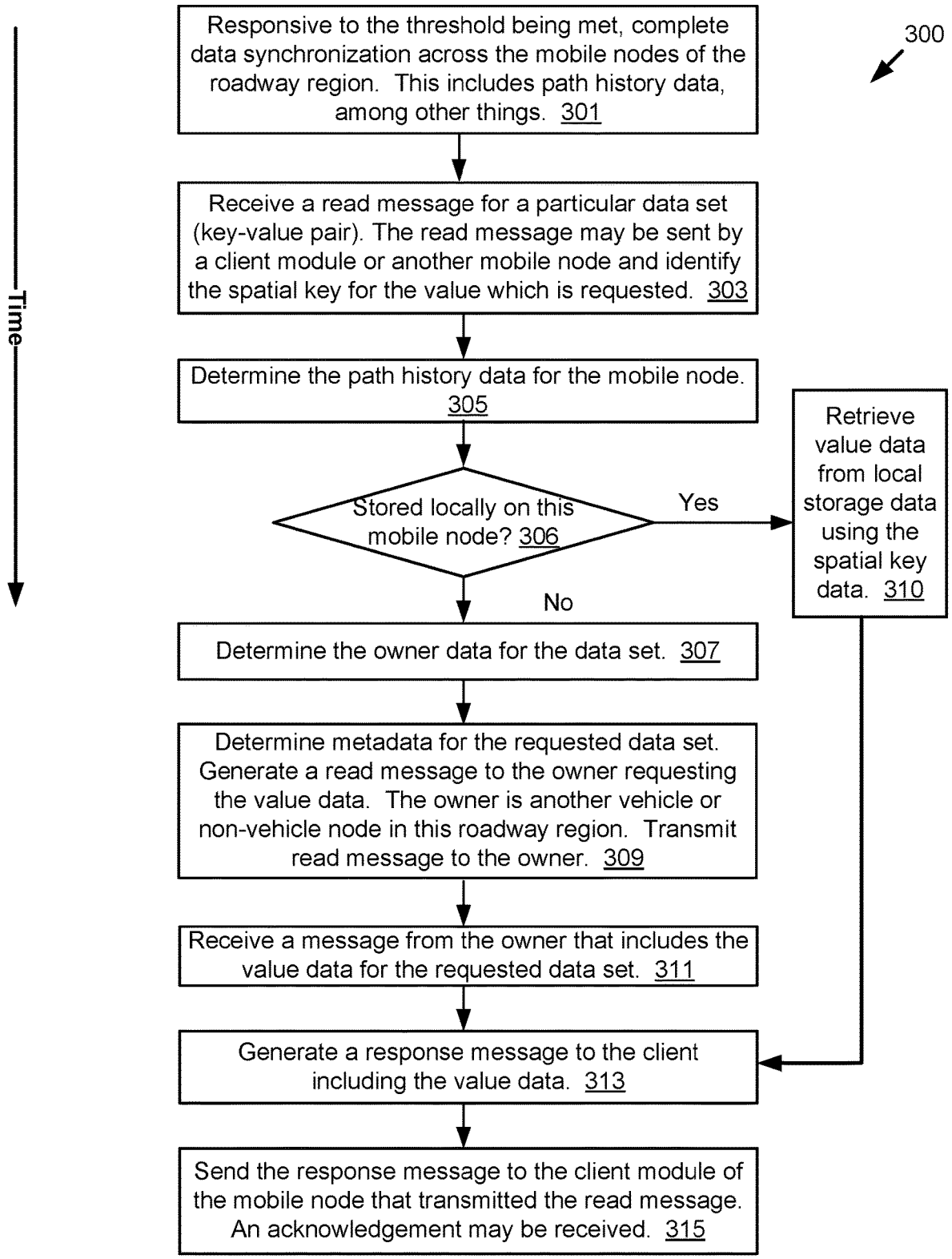
FIG. 3 is a flowchart of an example method for processing a read message according to some embodiments.

Referring now to FIG. 3, depicted is a flowchart of an example method 300 for processing a read message according to some embodiments. One or more steps of the method 300 may be executed by the computer system 200 described above with reference to FIG. 2.

At step 301, responsive to the threshold being met, a data synchronization event is completed across the mobile nodes of the roadway region. This data synchronization event may synchronize one or more of the following types of data across the memories of the mobile nodes for a given roadway region: the region data 299; the coordinator data 298; the region storage data 293; the local storage data 291; the threshold data 292; the path history data 290; and the lookup table 156. In this way, some amount of data may be commonly known to each of the mobile nodes within a roadway region.

At step 303, a read message is received. The read message may request to read (or have access to) a particular data set 189. The read message may be sent by a client module or another mobile node and identify the spatial key for the value which is requested. For example, the read message may include an instance of spatial key data. The read message may also include an identifier of the value which is paired with the spatial key data, but not the actual content of the value data that is paired with the spatial key data. For example, the identifier of the value may include a file name or some other data that identifies the requested value data that is paired with the spatial key data. Such identifiers of the value data may be included in the data which was synchronized across each of the mobile nodes of the roadway region in step 301.

The client module of the mobile node which transmits the read message in step 303 may know the spatial key data and the identifier of the value data based on the data which is synchronized at step 301.

At step 305, the path history data for the mobile node which received the read message at step 303 is determined. This path history data may be analyzed against the spatial key data to determine whether the value data which is being requested is stored locally by this mobile node or on a different mobile node. For example, the path history data may indicate the geographic location of the mobile node and this geographic location may correspond to the spatial key included in the read message or not. Step 305 is an optional step of the method 300 according to some embodiments.

In some embodiments, the owner data for the spatial key data and the identified value data may be determined based on providing one or more of the spatial key data and the identifier of the value data to the distribution module, which then outputs the owner data using its hash function or the lookup table. The owner data which is outputted by the distribution module indicates whether the value data is stored locally by the memory of this mobile node or remotely by a memory of a different mobile node.

At step 306, a determination is made regarding whether the requested value data is stored locally or remotely. If the value data is determined to be stored locally at step 306, then the method 300 proceeds to step 310. If the value data is determined to be stored remotely at step 306, then the method 300 proceeds to step 307.

At step 310, the value data is retrieved from the local memory using the spatial key data. For example, since the data sets 189 have a paired spatial key and value data associated with that spatial key, the value data may be retrieved from the memory using the spatial key data as a query.

At step 307, the owner data for the requested data set is determined. For example, the owner data may be determined by providing one or more of the spatial key data or the indicator of the value data to the distribution module as an input, which then outputs the owner data for the data set requested by the read message. The distribution module (e.g., the hash function or the lookup table) may be operable to provide this output responsive to this input.

At step 309, the metadata for the data set is determined. For example, the metadata may be determined by providing one or more of the spatial key data or the indicator of the value data to the distribution module as an input, which then outputs the metadata for the data set requested by the read message. The distribution module (e.g., the hash function or the lookup table) may be operable to provide this output responsive to this input. A read message may be transmitted to the owner of the requested data set. The read message may include one or more of the metadata, the spatial key data for the requested data set and the identifier of the value data included in the requested data set.

At step 311, a response message is received from the owner. This response message includes the value data that is included in the requested data set. The mobile node that received the read message at step 303 now includes the spatial key data, the value data, the owner data and the metadata for the requested data set.

At step 313, a response message for the read message received at step 303 is generated. This response message includes the value data for the requested data set which was the subject of the read message received at step 303.

At step 315, the response message generated at step 313 is transmitted to the client module or the mobile node that transmitted the read message which was received at step 303. An acknowledgement message from the client module or the mobile node is subsequently received.

Figure 4:
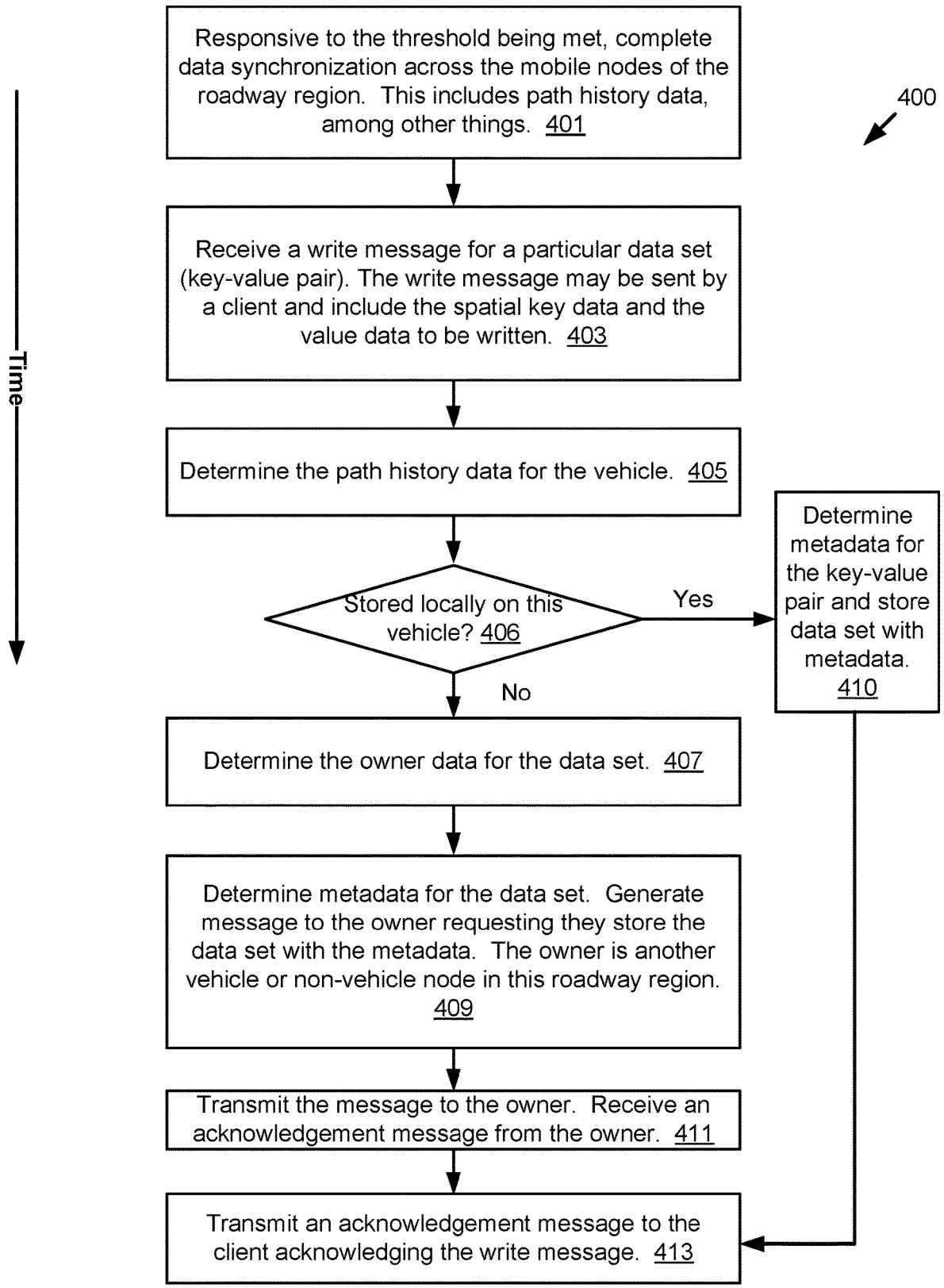
FIG. 4 is a flowchart of an example method for processing a write message according to some embodiments.

Referring now to FIG. 4, depicted is a flowchart of an example method 400 for processing a write message according to some embodiments.

At step 401, responsive to the threshold being met, a data synchronization event is completed across the mobile nodes of the roadway region. This data synchronization event may synchronize one or more of the following types of data across the memories of the mobile nodes for a given roadway region: the region data 299; the coordinator data 298; the region storage data 293; the local storage data 291; the threshold data 292; the path history data 290; and the lookup table 156. In this way, some amount of data may be commonly known to each of the mobile nodes within a roadway region.

At step 403, a write message is received. The write message may request to write a particular data set 189 to a memory of one or the mobile nodes of this roadway region. The write message may be sent by a client module or another mobile node and identify the spatial key for the value which is requested. For example, the write message may include an instance of spatial key data and the value data to be written.

At step 405, the path history data for the mobile node which received the write message at step 403 is determined. This path history data may be analyzed against the spatial key data to determine whether the value data which is being requested is stored locally by this mobile node or on a different mobile node. For example, the path history data may indicate the geographic location of the mobile node and this geographic location may correspond to the spatial key included in the read message or not. Step 405 is an optional step of the method 400 according to some embodiments.

In some embodiments, the owner data for the spatial key data and the value data included in the write message may be determined based on providing one or more of the spatial key data and the value data to the distribution module, which then outputs the owner data using its hash function or the lookup table. The owner data which is outputted by the distribution module indicates whether the data set included in the write message is stored locally by the memory of this mobile node or remotely by a memory of a different mobile node.

At step 406, a determination is made regarding whether the data set is stored locally or remotely. If the data set is determined to be stored locally at step 406, then the method 400 proceeds to step 410. If the data set is determined to be stored remotely at step 406, then the method 400 proceeds to step 407.

At step 410, the metadata for the data set is generated and the stored, along with the data set, in the local memory At step 407, the owner data for the data set is determined.

At step 409, the metadata for the data set is determined. A write message may be transmitted to the owner of the data set. The write message may include one or more of the metadata, the spatial key data for the value data.

At step 411, the write message is transmitted to the owner and the owner transmits an acknowledgement.

At step 413, an acknowledgement message for the write message received at step 403 is generated and transmitted to the transmitter of the write message received at step 403.

Figure 5:
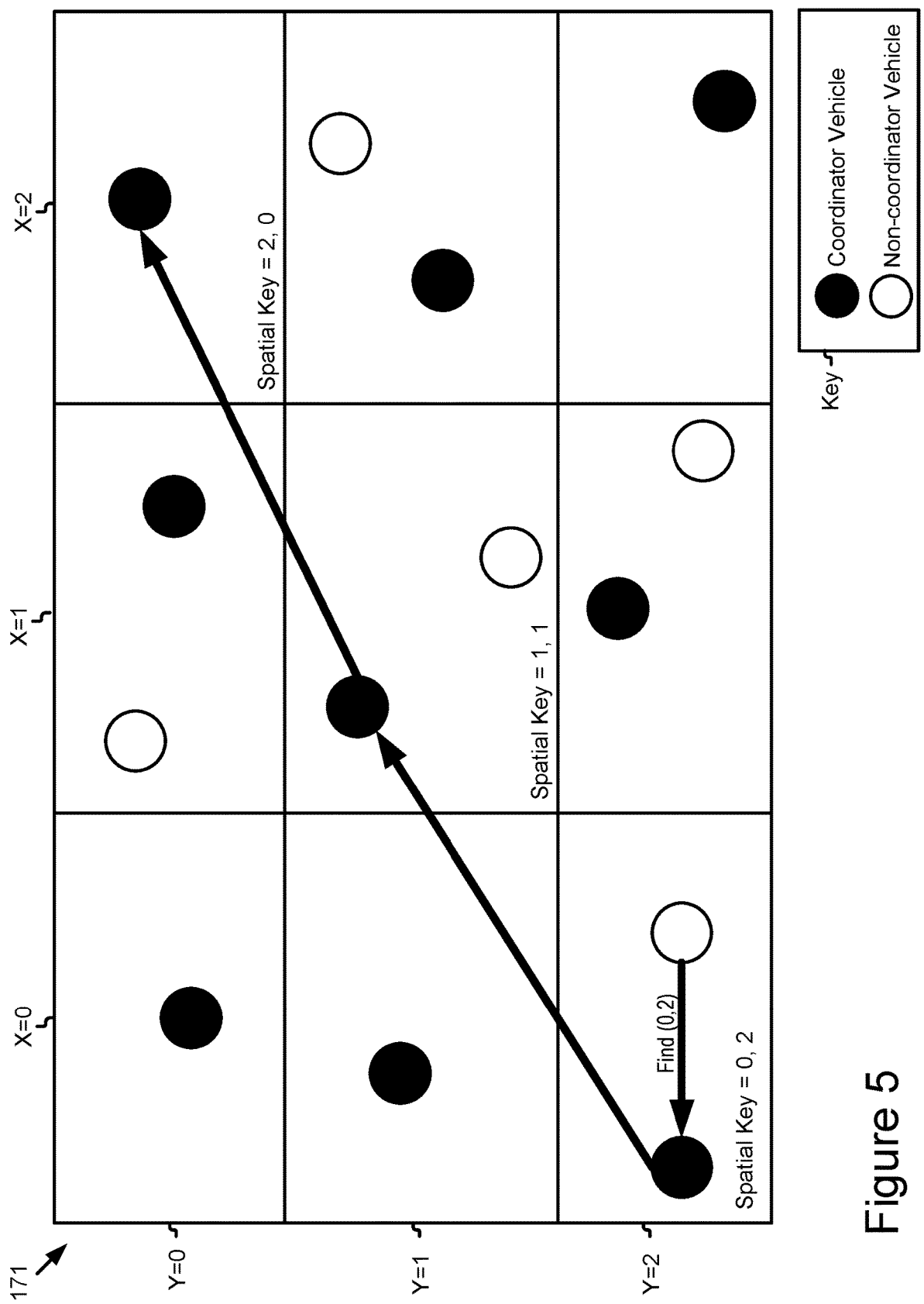
FIG. 5 is a block diagram illustrating an example use case of a micro-vehicular cloud according to some embodiments.

Referring now to FIG. 5, depicted is a block diagram illustrating an example use case of a micro-vehicular cloud according to some embodiments.

In FIG. 5, the roadway area 171 is partitioned into a three-by-three grid. A non-coordinator in a roadway region assigned spatial key 0,2 requests to read data which is stored in a roadway region assigned spatial key 2,0. FIG. 5 depicts a read message being transmitted, and relayed by the coordinator of the roadway region assigned spatial key 1, 1, to the coordinator for the roadway region assigned spatial key 2,0.

Figure 6A:
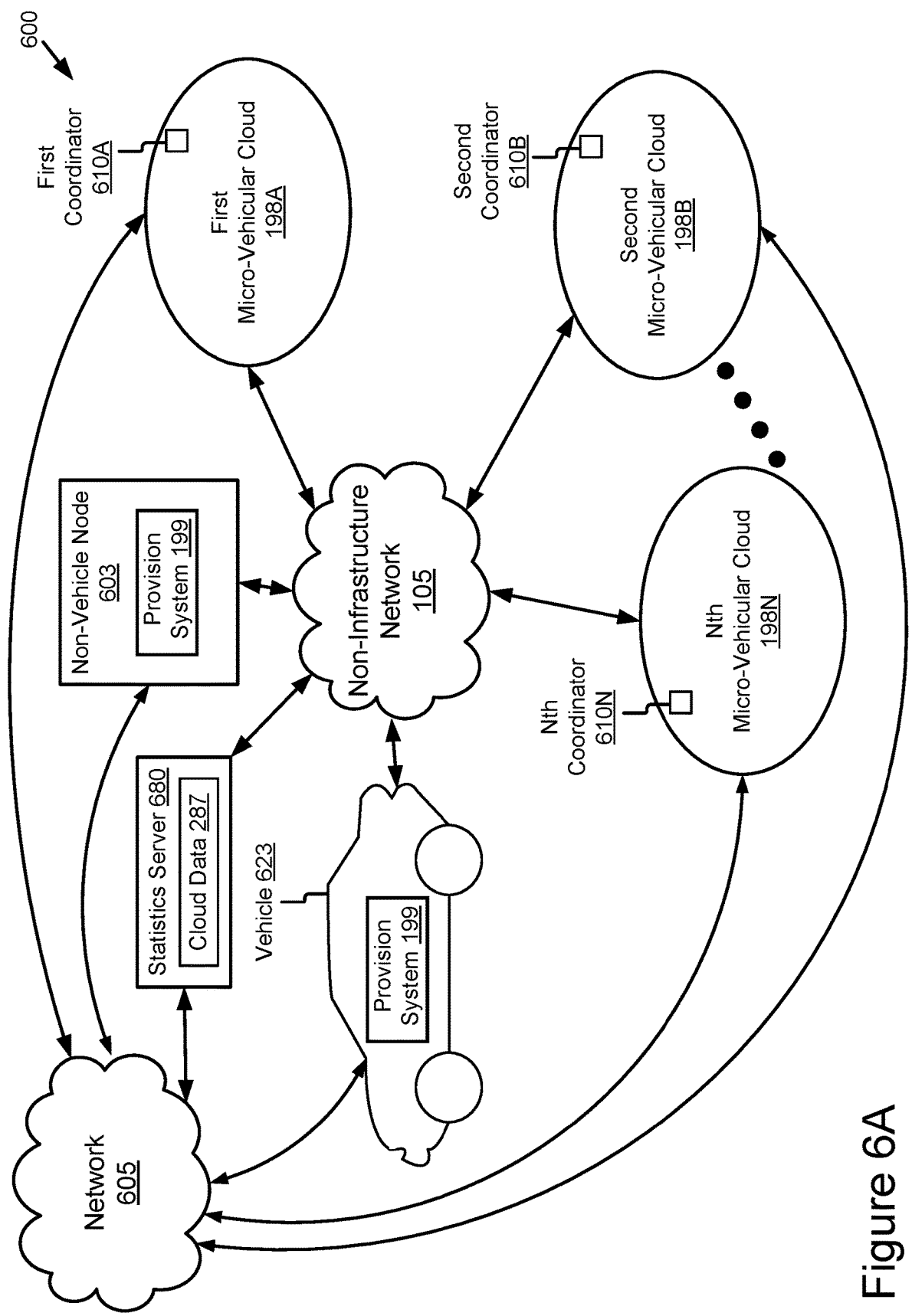
FIG. 6A is a block diagram illustrating an operating environment for a plurality of micro-vehicular clouds according to some embodiments.

Referring now to FIG. 6A, depicted is a block diagram illustrating an operating environment for a plurality of micro-vehicular clouds according to some embodiments.

As depicted, the operating environment 600 includes the following elements: a network 605; a statistics server 680; a vehicle 623; a non-vehicle node 603; a non-infrastructure network 105; a first micro-vehicular cloud 198A; a second micro-vehicular cloud 198B; and an Nth micro-vehicular cloud 198N. As used herein, "N" is any whole number which is greater than two.

The first micro-vehicular cloud 198A, the second micro-vehicular cloud 198B and the Nth micro-vehicular cloud 198N include elements which are similar to those of the micro-vehicular cloud 198 described above with reference to FIG. 1A, and so, those descriptions will not be repeated here. Each of the first micro-vehicular cloud 198A, the second micro-vehicular cloud 198B and the Nth micro-vehicular cloud 198N include a first coordinator 610A, a second coordinator 610B and an Nth coordinator 610N, respectively. As described above, a coordinator is a vehicle or RSU within a specific roadway region (as defined by the first micro-vehicular cloud 198A, the second micro-vehicular cloud 198B and the Nth micro-vehicular cloud 198N) which determines which mobile node included in the roadway region stores data for that roadway region or executes operations for that roadway region.

Figure 6B:
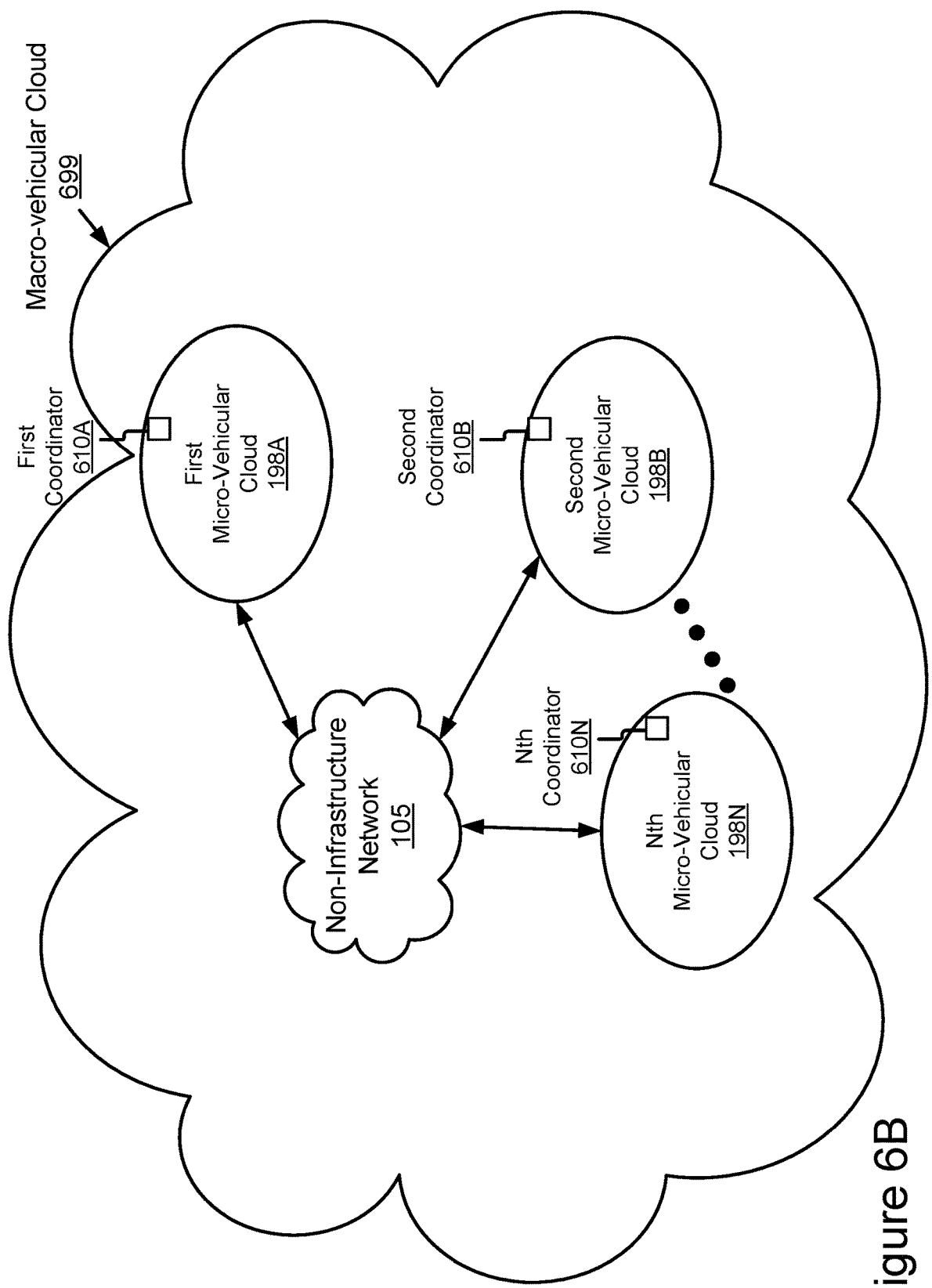
FIG. 6B is a block diagram illustrating a macro-vehicular cloud according to some embodiments.

As described above, coordinators (e.g., the first coordinator 610A, the second coordinator 610B and the Nth coordinator 610N) have other responsibilities such as managing communications among the different micro-vehicular clouds 198A, 198B, 198N of a macro-vehicular cloud and controlling the operations of the onboard vehicle computers of the vehicles included in each micro-vehicular clouds 198A, 198B, 198N so that these onboard vehicle computers provide themselves as a computing resource to other vehicles which are included in the macro-vehicular cloud (see, e.g., FIG. 6B).

The vehicle 623 includes similar elements and provides similar functionality as the first vehicle 123 and the second vehicle 123, and so, these descriptions will not be repeated here.

The non-vehicle node 603 includes similar elements and provides similar functionality as the non-vehicle node 103, and so, these descriptions will not be repeated here.

The statistics server 680 is a processor-based computing device which is operable to function as a server. In some embodiments, the statistics server 680 is a computer, server farm, laptop, tablet computer or some other processor-based computing device which includes any hardware or software necessary to communicate with one or more of the network 605 and the non-infrastructure network 105. In some embodiments, the statistics server 680 is a hardware server.

In some embodiments, the statistics server 680 is a server that maintains the cloud data 287 which was described above with reference to FIG. 2. For example, the cloud data 287 is stored on a non-transitory memory of the statistics server 680. The statistics server 680 may also include code and routines which are operable, when executed by a processor of the statistics server 680, to generate and maintain the cloud data 287. Endpoints such as the vehicle 623, non-vehicle node 603 or elements of the first micro-vehicular cloud 198A, the second micro-vehicular cloud 198B and the Nth micro-vehicular cloud 198N are operable to access the cloud data 287 and use the cloud data 287 as described above with reference to FIG. 2 and below with reference to FIGS. 6B-6H, 7 and 8.

The network 605 may be a conventional type, wired or wireless, and may have numerous different configurations including a star configuration, token ring configuration, or other configurations. Furthermore, the network 605 may include a local area network (LAN), a wide area network (WAN) (e.g., the Internet), or other interconnected data paths across which multiple devices and/or entities may communicate. In some embodiments, the network 605 may include a peer-to-peer network. The network 605 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2X, LTE-D2D, VoLTE or any other mobile data network or combination of mobile data networks. Further, the network 605 may include one or more IEEE 802.11 wireless networks.

In some embodiments, endpoints such as the vehicle 623, non-vehicle node 603 or elements of the first micro-vehicular cloud 198A, the second micro-vehicular cloud 198B and the Nth micro-vehicular cloud 198N access the cloud data 287 stored on the statistics server 680 using the network 605 and this is the only use for the network 605 since the non-infrastructure network 105 is used for all other wireless communications with other endpoints of the operating environment 600.

As depicted, each of the following elements of the operating environment 600 includes a provision system 199: the vehicle 623; the non-vehicle node 603; the first coordinator 610A; the second coordinator 610B; the Nth coordinator 610N; and vehicles 123, 124 and non-vehicle nodes 103 that are included as elements of the first micro-vehicular cloud 198A, the second micro-vehicular cloud 198B and the Nth micro-vehicular cloud 198N as depicted in FIG. 1A. The provision system 199 was described above, and so, these descriptions will not be repeated here.

Referring now to FIG. 6B, depicted is a block diagram illustrating a macro-vehicular cloud 699 according to some embodiments. As depicted, the macro-vehicular cloud 699 includes the following elements: a first micro-vehicular cloud 198A; a second micro-vehicular cloud 198B; and an Nth micro-vehicular cloud 198N. These elements of the macro-vehicular cloud 699 are each communicatively coupled to the non-infrastructure network 605.

In some embodiments, the first micro-vehicular cloud 198A, the second micro-vehicular cloud 198B and the Nth micro-vehicular cloud 198N are described as being communicatively coupled to the macro-vehicular cloud 699 because they are communicatively coupled to the non-infrastructure network 105 which is common to the elements of the macro-vehicular cloud 699. For example, if a vehicle included in the first micro-vehicular cloud 198A is communicatively coupled to the non-infrastructure network 105, then this vehicle is communicatively coupled to the macro-vehicular cloud 699 since this vehicle can then access the computing resources of the macro-vehicular cloud 699 by virtue of its communicative coupling to the non-infrastructure network 105.

In some embodiments, the first coordinator 610A, the second coordinator 610B and the Nth coordinator 610N are each communicatively coupled to the non-infrastructure network 605 and manage wireless communications among other elements of the macro-vehicular cloud 699 for the elements of the particular micro-vehicular could which manage. For example, the first coordinator 610A manages wireless communications for the elements of the first micro-vehicular cloud 198A, and the second coordinator 610B and the Nth coordinator 610N can also access the computing resources of the first micro-vehicular cloud 198A if the provision system 199 of the first coordinator 610A makes a determination to allow these computing resources to be accessed.

Referring now to FIGS. 6A and 6B collectively. In some embodiments, a vehicle such as vehicle 623 is communicatively coupled to the macro-vehicular cloud 699 via the non-infrastructure network 105. The macro-vehicular cloud 699 includes a plurality of micro-vehicular clouds. For example, the macro-vehicular cloud 699 includes the first micro-vehicular cloud 198A, the second micro-vehicular cloud 198B, and the Nth micro-vehicular cloud 198N.

In some embodiments, each of the micro-vehicular clouds of the macro-vehicular cloud 699 includes a set of onboard vehicle computers which are operable to provide a set of computing resources to the macro-vehicular cloud 699 via the non-infrastructure network 105. For example, one or more of the plurality of micro-vehicular clouds includes a set of vehicles, and these vehicles each include an onboard vehicle computer. Each onboard vehicle computer provides a computing resource to the macro-vehicular cloud 699. This computing resource includes, for example, the ability to execute operations, store data or provide other computing functions. The various onboard vehicle computers of the macro-vehicular cloud 699 collectively form a set of onboard vehicle computers which are operable to provide a set of computing resources to the macro-vehicular cloud 699.

In some embodiments, a vehicle is a member of a selected micro-vehicular cloud. For example, the vehicle 623 is an element of the first micro-vehicular cloud 198A and the first micro-vehicular cloud 198A is referred to as the selected micro-vehicular cloud. In some embodiments, the selected micro-vehicular cloud is an element of the macro-vehicular cloud 699 such that the vehicle (e.g., the vehicle 623) is also a member of the macro-vehicular cloud 699. In some embodiments, the vehicle (e.g., the vehicle 623) includes a provision system 199. Because the vehicle (e.g., the vehicle 623) is a member of the macro-vehicular cloud 699 and includes a provision system 199, the vehicle is also operable to receive a service from the set of computing resources of the macro-vehicular cloud 699 via the non-infrastructure network 105. In some embodiments, the service includes at least one of storing data for the vehicle (e.g., the vehicle 623) and executing one or more operations for the vehicle. For example, the vehicle may request that another vehicle of the second micro-vehicular cloud 198B store data for the vehicle which the vehicle can then retrieve when the vehicle is present in the roadway region that includes the second micro-vehicular cloud 198B.

In some embodiments, the non-infrastructure network 105 includes a DSRC network which sends and receives wireless messages over a 5.9 gigahertz (GHz) DSRC band and the vehicle (e.g., the vehicle 623) requests the service by transmitting a DSRC message to the coordinator of the selected micro-vehicular cloud which includes a request for the service, and optionally, information that specifies which micro-vehicular cloud of the macro-vehicular cloud 699 should provide the service to the vehicle.

In some embodiments, the non-infrastructure network 105 includes a millimeter wave communication network which sends and receives wireless messages over a 5.9 gigahertz (GHz) DSRC band and the vehicle (e.g., the vehicle 623) requests the service by transmitting a DSRC message to the coordinator of the selected micro-vehicular cloud which includes a request for the service, and optionally, information that specifies which micro-vehicular cloud of the macro-vehicular cloud 699 should provide the service to the vehicle.

In some embodiments, the non-infrastructure network 105 includes a millimeter wave communication network and the merge service is requested by the vehicle (e.g., the vehicle 623) using a millimeter wave communication message.

In some embodiments, the non-infrastructure network 105 includes a full-duplex wireless communication network and the merge service is requested by the vehicle (e.g., the vehicle 623) using a full-duplex wireless communication message.

As described above, the macro-vehicular cloud 699 includes a plurality of micro-vehicular clouds such as the first micro-vehicular cloud 198A, the second micro-vehicular cloud 198B and the Nth micro-vehicular cloud 198N. In some embodiments, each individual micro-vehicular cloud of the plurality of micro-vehicular clouds which form the macro-vehicular cloud 699 includes: (1) one or more other vehicles (e.g., the first vehicle 123 and the second vehicle 124); and (2) a coordinator (e.g., the first coordinator 610A, the second coordinator 610B, the Nth coordinator 610N). In some embodiments, these one or more other vehicles and coordinators are communicatively coupled to the non-infrastructure network 105 and the coordinator of each individual micro-vehicular cloud is communicatively coupled to the macro-vehicular cloud 699 via the non-infrastructure network 105. Similarly, the vehicle (e.g., the vehicle 623) is communicatively coupled to the macro-vehicular cloud 699 via the coordinator of the selected micro-vehicular cloud (e.g., via the first coordinator 610A of the first micro-vehicular cloud 198). In this way, the vehicle (e.g., the vehicle 623) is operable to receive the service from the coordinator of the selected micro-vehicular cloud (the first coordinator 610A of the first micro-vehicular cloud 198) which itself accesses the computing resources of the macro-vehicular cloud 699 via the non-infrastructure network 105.

As described above, in some embodiments each individual micro-vehicular cloud of the plurality of micro-vehicular clouds which form the macro-vehicular cloud 699 includes: (1) one or more other vehicles (e.g., the first vehicle 123 and the second vehicle 124); and (2) a coordinator (e.g., the first coordinator 610A, the second coordinator 610B, the Nth coordinator 610N). In some embodiments, the one or more other vehicles are at least momentarily dynamic while the plurality of micro-vehicular clouds are each located at a fixed geographical region (e.g., a roadway region as described by the region data 299) which is static and different from the fixed geographical region of other micro-vehicular clouds included in the plurality of micro-vehicular clouds. For example, the fixed geographic region of the first micro-vehicular cloud 198A is different from the fixed geographic regions for either of the second micro-vehicular cloud 198B and the Nth micro-vehicular cloud 198N.

In some embodiments, the set of onboard vehicle computers are each elements of the one or more other vehicles of the plurality of micro-vehicular clouds.

In some embodiments, each coordinator for the plurality of micro-vehicular clouds is selected from a group that includes the one or more other vehicles and an RSU.

Figure 6C:
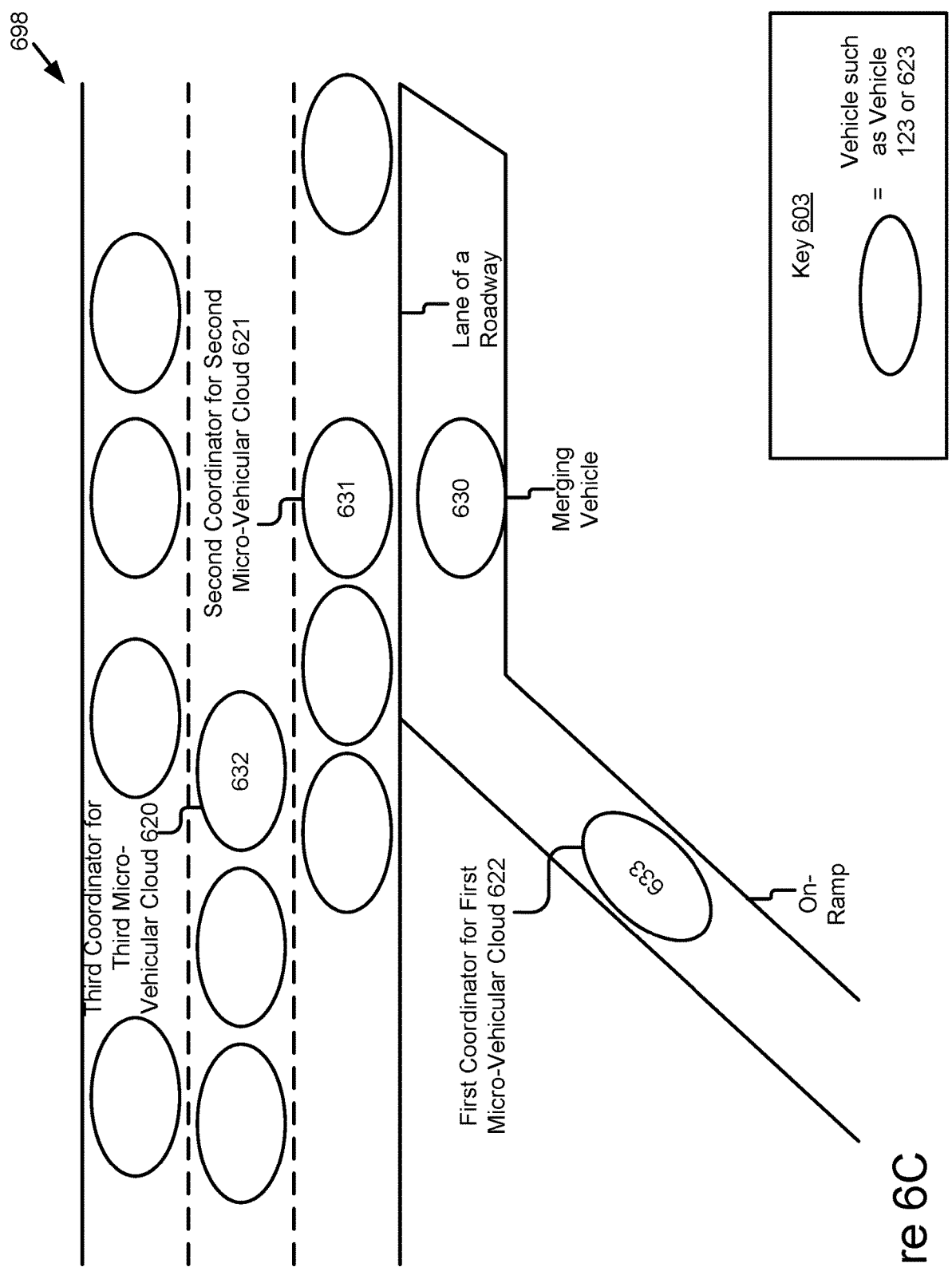
FIGS. 6C-6E are block diagrams illustrating an operating environment for a merge module to use the macro-vehicular cloud to provide a merge service according to some embodiments.
Figure 6D:
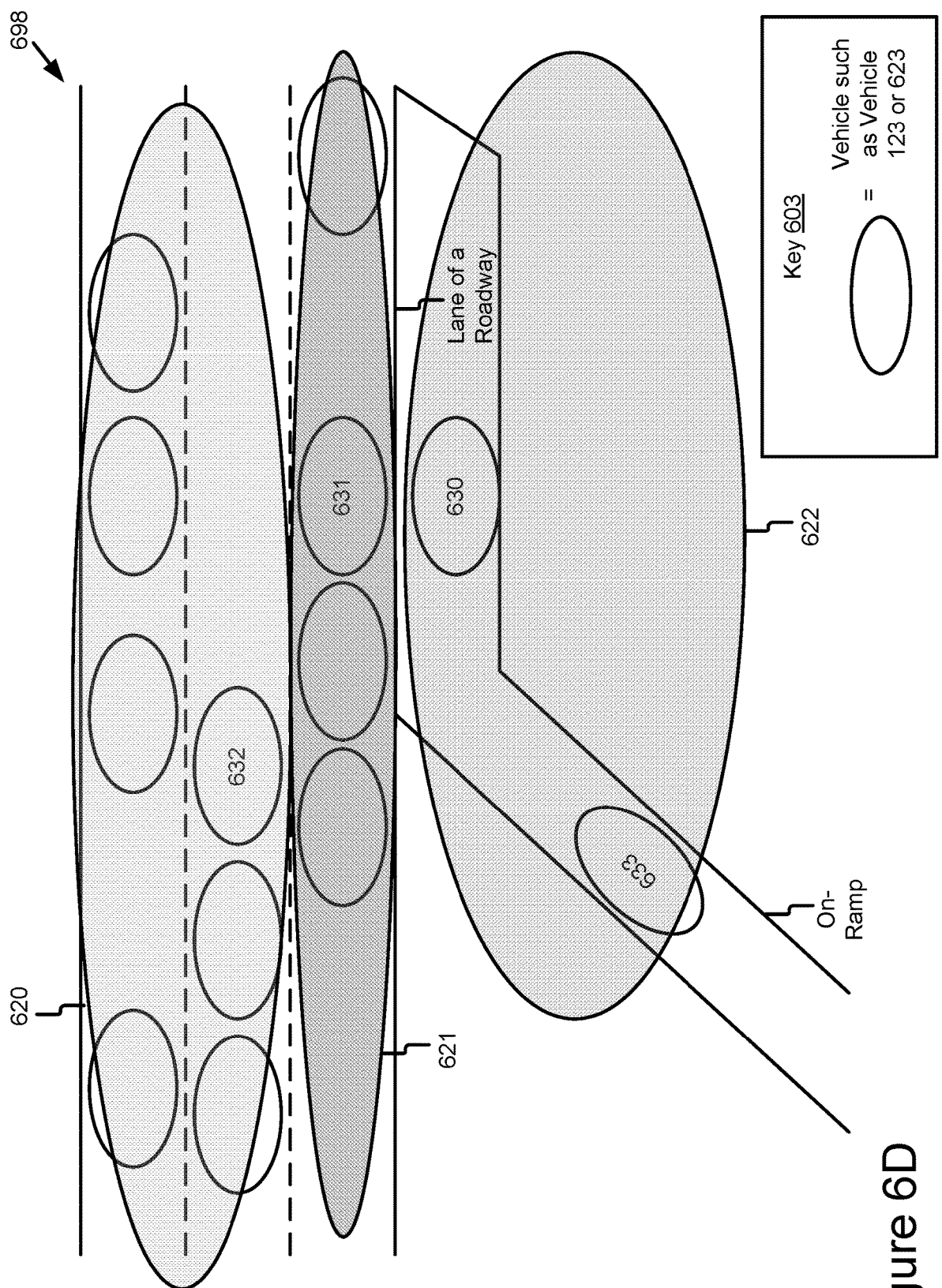
Figure 6E:
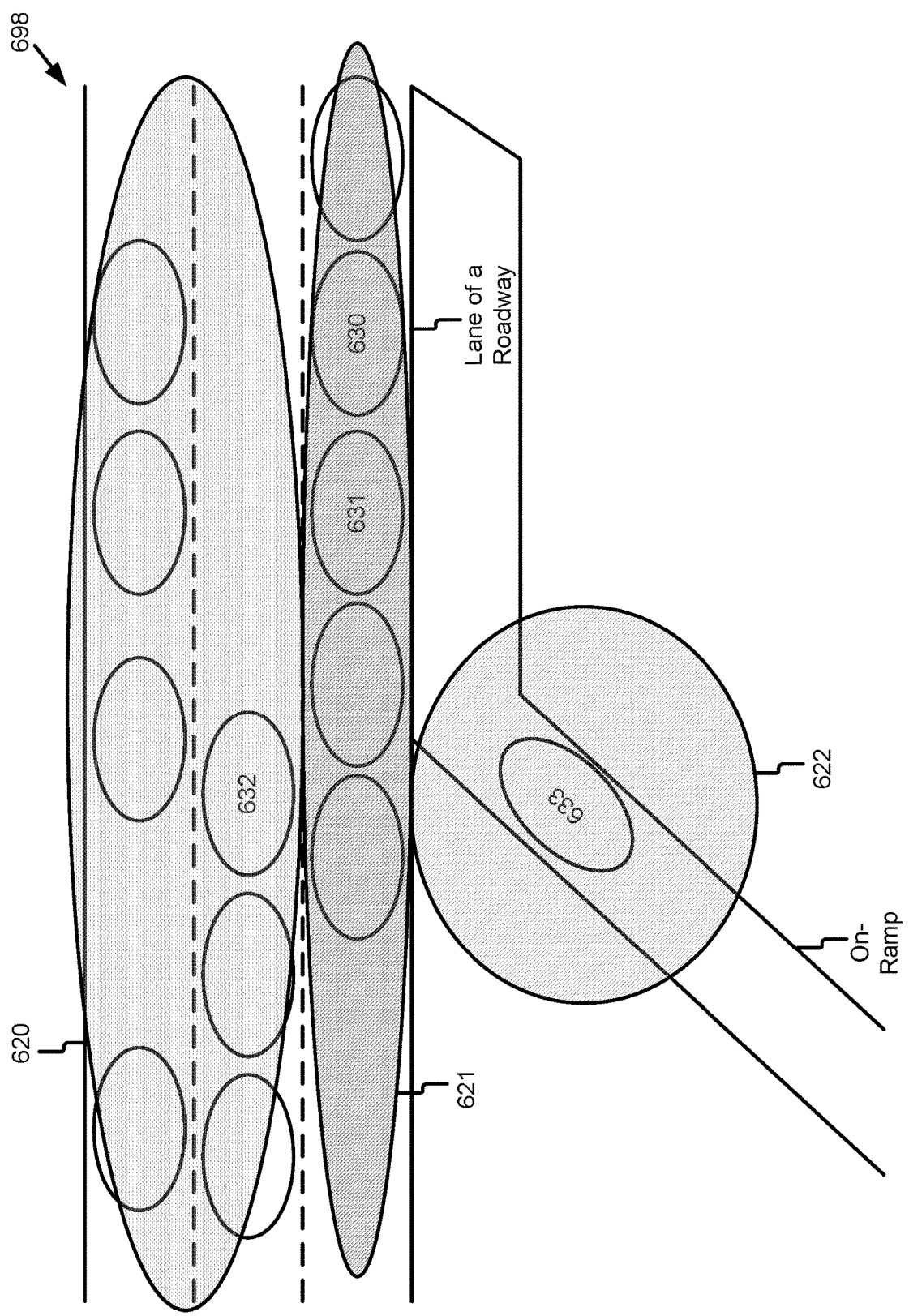

Referring now to FIGS. 6C-6E, depicted are block diagrams illustrating an operating environment 698 for a merge module to use the macro-vehicular cloud to provide a merge service according to some embodiments. The descriptions for FIGS. 6C-6E can be read together as explaining the merge service provided by the merge module according to some embodiments.

A merge service includes a merge module of one or more provision systems 199 of one or more vehicles, such as the vehicle 123 or the vehicle 623, to assist a merging vehicle 630 to exit an on-ramp and enter a lane of a roadway.

Referring now to FIG. 6C. The bottom right-hand corner of FIG. 6C includes a key 603. The key 603 describes that each elliptical-shaped object depicted in FIGS. 6C-6H is a vehicle such as the vehicle 123 or the vehicle 623 that includes a provision system 199. In some embodiments, the vehicles depicted with an elliptical-shaped object in FIGS. 6C-6H are DSRC-enabled vehicles. Because these vehicles include a provision system 199, they are each operable to send and receive wireless messages via the non-infrastructure network 105 (not pictured).

Vehicle 633 is a first coordinator for a first micro-vehicular cloud 622. Vehicle 631 is a second coordinator for a second micro-vehicular cloud 621. Vehicle 632 is a third coordinator for a third micro-vehicular cloud 620. The first micro-vehicular cloud 622, the second micro-vehicular cloud 621 and the third micro-vehicular cloud 620 include similar functionality as the first micro-vehicular cloud 198A, the second micro-vehicular cloud 198B and the Nth micro-vehicular cloud 198N described above with reference to FIGS. 1A, 6A and 6B, and so, these descriptions will not be repeated here. The first micro-vehicular cloud 622, the second micro-vehicular cloud 621 and the third micro-vehicular cloud 620 are depicted in FIGS. 6D and 6E.

Vehicle 630 is a member of the first micro-vehicular cloud 622. The vehicle 630 is present on an on-ramp of a roadway environment. The vehicle 630 desires the merge onto a lane of a roadway adjacent to the on-ramp so that the vehicle 630 can travel in the lane of the roadway.

Referring now to FIG. 6D, depicted is the operating environment 698 with each of the vehicles of FIG. 6C grouped into a micro-vehicular cloud. The following micro-vehicular clouds are depicted in FIG. 6D: the first micro-vehicular cloud 622; the second micro-vehicular cloud 621; and the third micro-vehicular cloud 620. The number of micro-vehicular clouds depicted in FIG. 6D is only an example; other embodiments include more or less micro-vehicular clouds. In some embodiments, the micro-vehicular clouds may overlap one another.

In the depicted embodiment, the merging vehicle 630 desires to merge into the lane of the roadway adjacent to the on-ramp. For example, the merging vehicle 630 includes an Advanced Driver Assistance System ("ADAS system" if singular, "ADAS systems" if plural) and the ADAS system makes a decision to merge the merging vehicle 630 onto the roadway adjacent to the on-ramp. The merging vehicle 630 transmits a merge request to the vehicle 633 which is the coordinator for the first micro-vehicular cloud 622 which includes the merging vehicle 630 as a member. The merge request may be sent responsive to the decision to merge on the roadway from the on-ramp. The ADAS system, and examples of different ADAS systems, is described in more detail below with reference to the ADAS system 880 depicted in FIG. 8.

In some embodiments, the merge request is a wireless message that is transmitted by the communication unit of the merging vehicle 630 via the non-infrastructure network. The merge request is described in more detail below with reference to FIG. 7.

In some embodiments, the merge request is transmitted by the merging vehicle 630 to the coordinator of the micro-vehicular cloud network which includes the merge vehicle 630, i.e., the vehicle 633, via the non-infrastructure network. The vehicle 633 then forwards the merge request to the coordinator for the second micro-vehicular cloud 621, i.e., the vehicle 631, since this is the coordinator for the geographic area which includes the portion of the lane which is accessible by the merging vehicle 630 for successfully merging into the lane of the roadway.

As described in more detail below with reference to FIG. 7, in some embodiments the vehicle 631 determines a merge solution for the merge request based on relevant local state data for one or more of the first micro-vehicular cloud 622, the second micro-vehicular cloud 621 and the third micro-vehicular cloud 620. The local state data includes, for example, an aggregation of the DSRC data 195 for each vehicle which is a member of each respective micro-vehicular cloud. In some embodiments, the merge module 210 of the vehicle 631 analyses the local state data to determine what portions of the lane are available to the merging vehicle

630 to successfully merge into the lane and determines a merge solution based on this analysis.

For example, the merge module 210 maps the GPS data 294 included in each instance of DSRC data 195 against a map or grid that represents the present roadway environment and, based on this mapping as well as knowledge of the size of each vehicle as indicated by the "vehicle type" information included in Part 2 of the DSRC data 195, determines: (1) which portions of the lane are available to the merging vehicle 630 to successfully complete a merging maneuver into the lane; and (2) a merge solution based on this understanding of the portions of the lane which are available to the merging vehicle 630 to successfully merge into the lane.

Figure 6F:
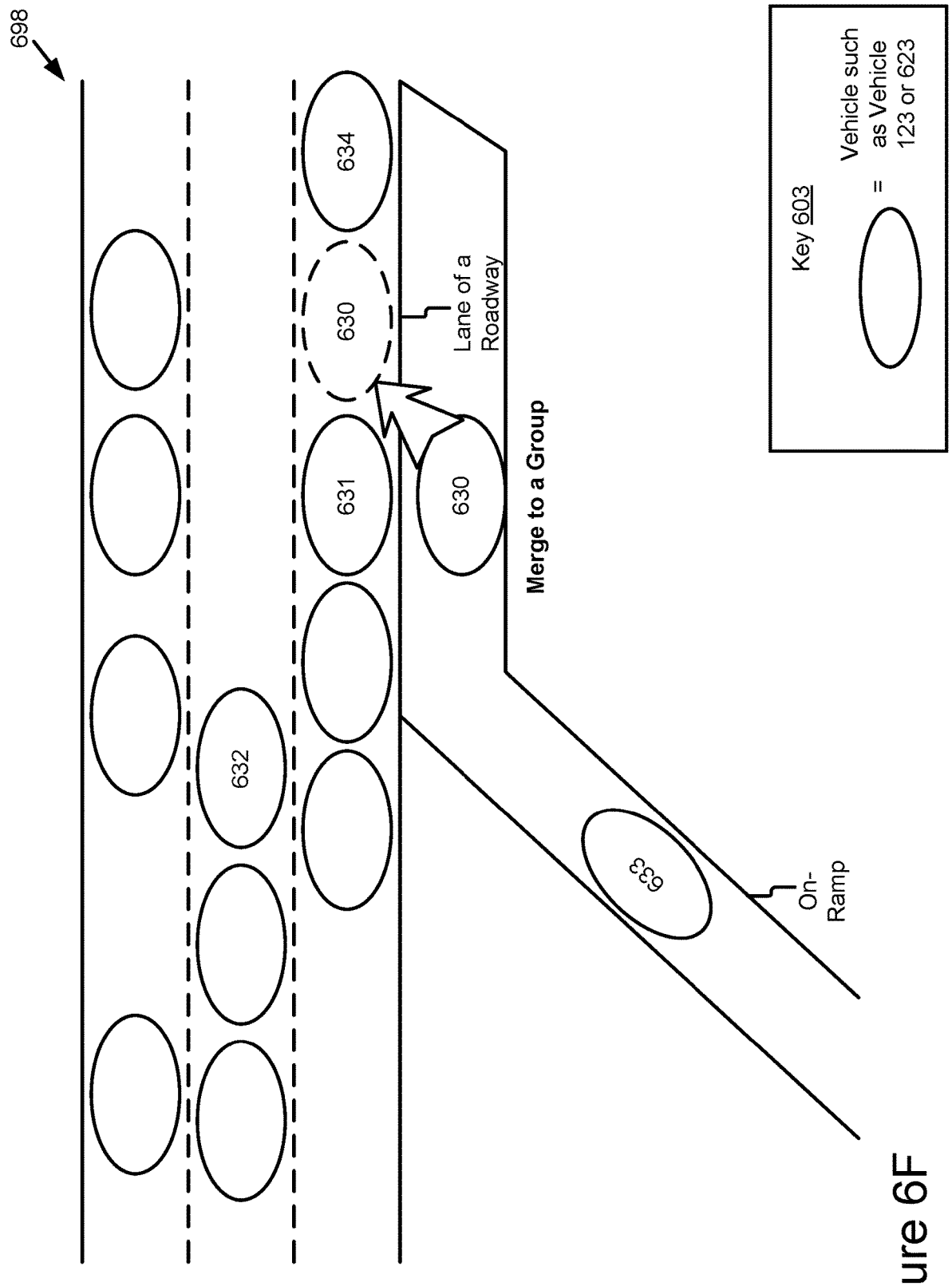
FIG. 6F is a block diagram illustrating a merge to a group merge solution according to some embodiments.
Figure 6G:
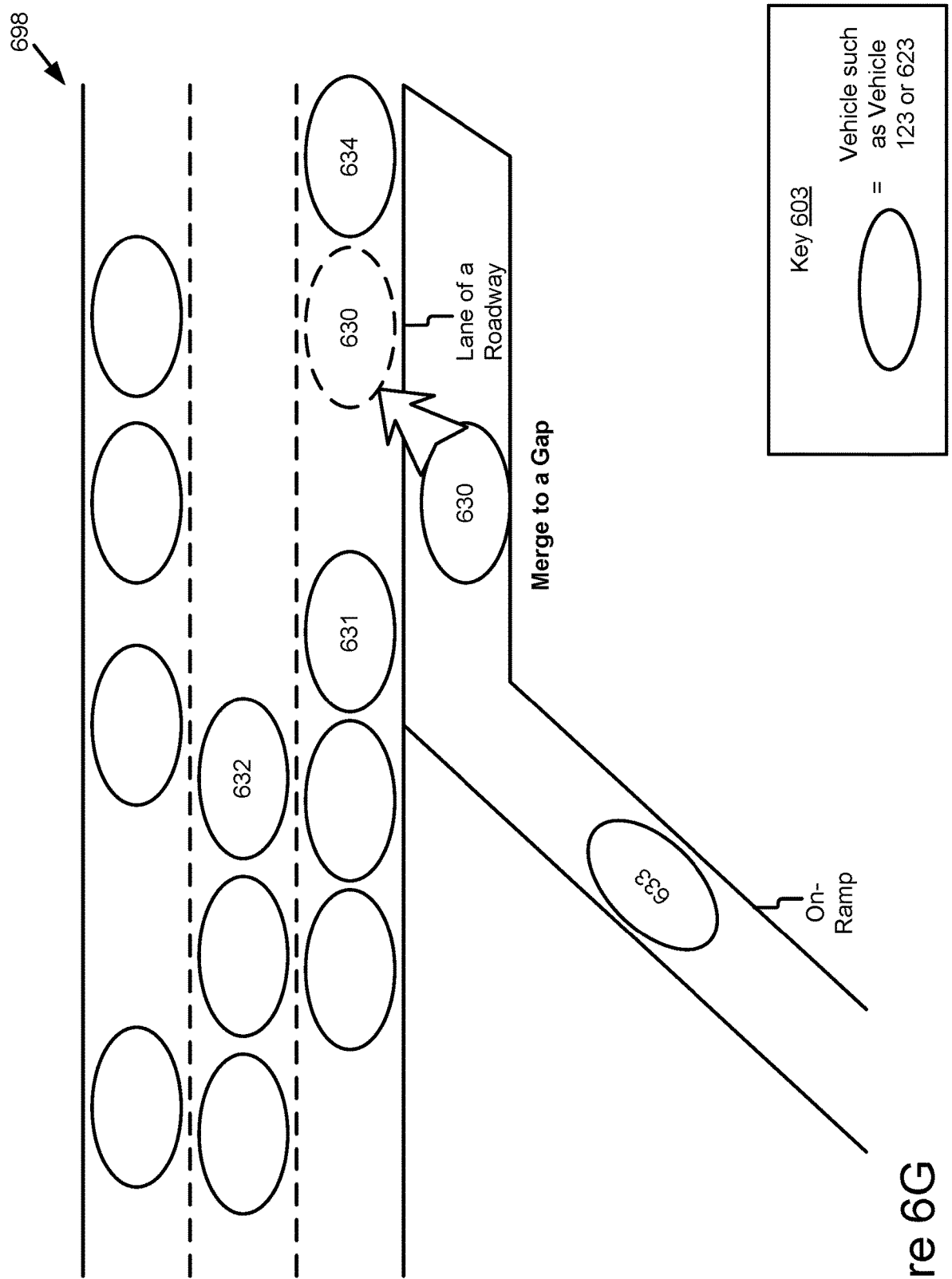
FIG. 6G is a block diagram illustrating a merge to a gap merge solution according to some embodiments.
Figure 6H:
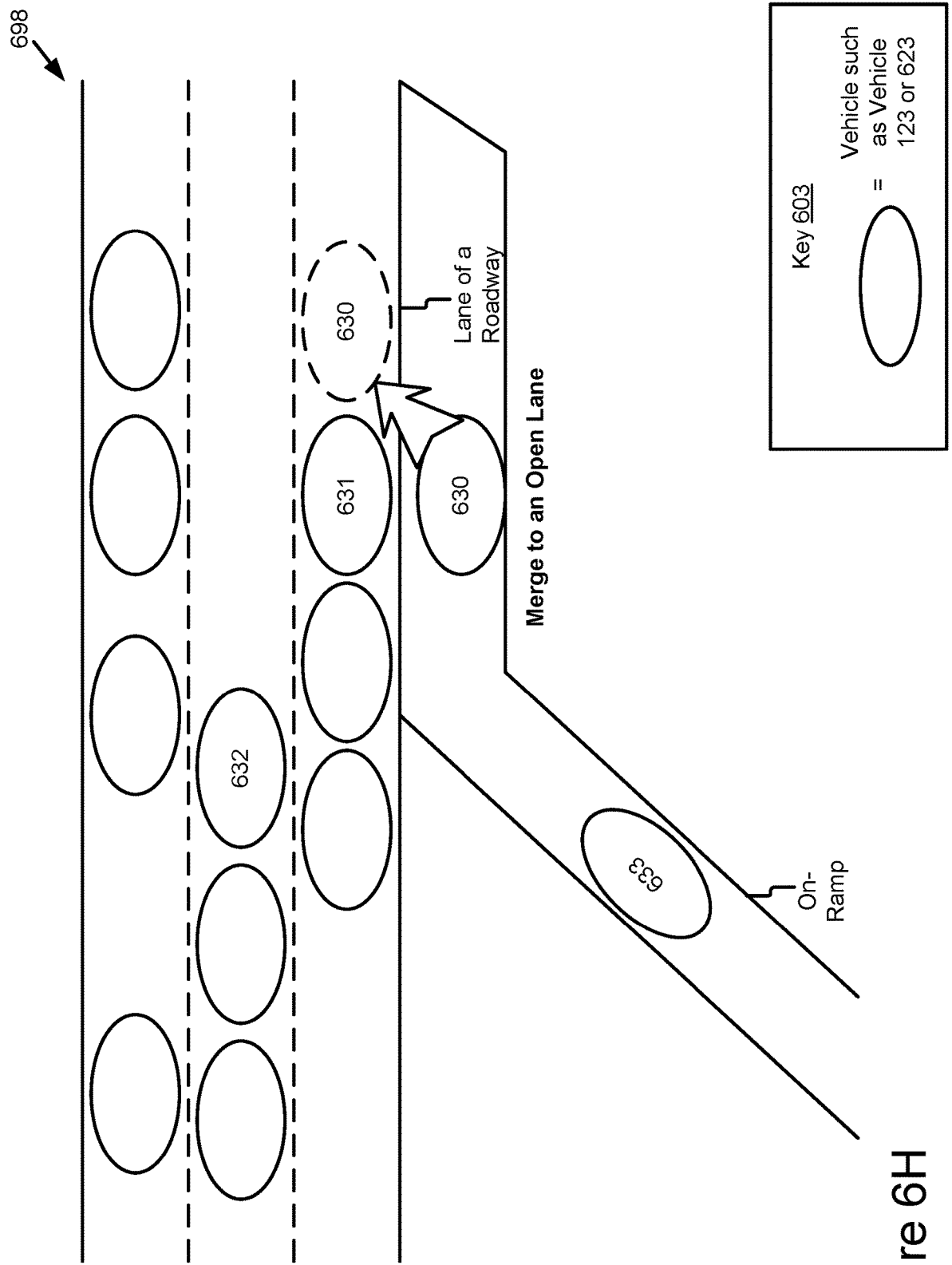
FIG. 6H is a block diagram illustrating a merge to an open lane merge solution according to some embodiments.

The merge solution includes one or more of the following: merge to a group (see, e.g., FIG. 6F); merge to a gap (see, e.g., FIG. 6G); and merge to an open lane (see, e.g., FIG. 6H). The merge solution is variable based on the relative positions of the different vehicles and what space is available for the merging vehicle 630 to successfully merge in the lane of the roadway.

Referring now to FIG. 6E, depicted is the operating environment 698 in which the merging vehicle 630 has merged into the lane of the roadway. The merging vehicle 630 has left the first micro-vehicular cloud 622 and joined the second micro-vehicular cloud 621 because the change in geographic position places the merging vehicle 630 in the geographic area which is covered by the second micro-vehicular cloud 621. In the depicted embodiment, none of the vehicles included in the second micro-vehicular cloud 621 had to change lanes of travel in order to make space for the merging vehicle 630 to merge into the lane of the roadway. However, in some embodiments, one or more of the vehicles included in the second micro-vehicular cloud 621 have to change lanes of travel, and possible membership from the second micro-vehicular cloud 621 to the third micro-vehicular cloud 620, in order to make room in the lane of the roadway so that the merging vehicle has adequate room to safely merge from the on-ramp to the lane of the roadway.

Example merge solutions are now described below with reference to FIGS. 6F-6H. These example merge solutions may be referred to collectively as "candidate merge solutions" if referred to collectively or a "candidate merge solution" if referred to individually.

Referring now to FIG. 6F, depicted is a block diagram illustrating a merge to a group merge solution according to some embodiments. The dashed elliptical shaped represents the area of the roadway which the merging vehicle 630 will occupy when it merges into the lane of the roadway. As depicted, a group of vehicles are traveling in the lane and there exists enough space between two of the vehicles traveling in the lane (e.g., vehicle 631 and vehicle 634) for the merging vehicle 630 to safely merge into the lane by joining the group.

In some embodiments, the coordinator for the second micro-vehicular cloud (e.g., vehicle 631) analyzes the local state data for the second micro-vehicular cloud (e.g., the DSRC data 195 for each of the vehicles included in the second micro-vehicular cloud) and determines that the merge solution is for the merging vehicle 630 to merge into the roadway in such a way that the merging vehicle 630 occupies the space between the two vehicles (e.g., vehicle 631 and vehicle 634) which are part of the group, i.e., to execute a "merge to a group" operation.

For example, the merge module 210 of the vehicle 631 includes code and routines which are operable, when executed by a processor of the vehicle 631, to cause the processor to execute one or more of the following steps: (1) map the GPS data 294 included in the DSRC data 195 for each of the vehicles included in the second micro-vehicular cloud to an electronic map or an electronic grid; (2) map information describing the sizes of each of these vehicles as well as the size of the merging vehicle 630 [this information may be included in the merge request] to the electronic map or the electronic grid; (3) determine, based on these mappings, that an area exists between the vehicle 631 and the vehicle 634 which is big enough for the merging vehicle 630 to occupy; (4) determine that the area is safely accessible by the merging vehicle 630 based on its current location, speed, acceleration and heading [all of which may be included in the merge request] as well as the current location, speed, acceleration and heading of the vehicle 631 and the vehicle 634; (5) determine the approximate GPS coordinate of the available area; (6) determine that the merge solution is for the merging vehicle 630 to "merge to a group" and drive to the GPS coordinate of step (5); and (6) transmit, via the non-infrastructure network, a wireless message including digital data describing the merge solution to the coordinator of the micro-vehicular cloud that includes the merging vehicle 630. In some embodiments, the determination module 808 of the merge module 210 includes the code and routines that are operable, when executed by the processor, to cause the processor to execute one or more of the steps described in this paragraph.

Referring to FIG. 6G, depicted is a block diagram illustrating a merge to gap merge solution according to some embodiments. The dashed elliptical shaped represents the area of the roadway which the merging vehicle 630 will occupy when it merges into the lane of the roadway. As depicted, a gap exists between two vehicles traveling in the lane (e.g., vehicle 631 and vehicle 634) which is big enough for the merging vehicle 630 to safely merge into the lane by merging into the gap.

In some embodiments, the coordinator for the second micro-vehicular cloud (e.g., vehicle 631) analyzes the local state data for the second micro-vehicular cloud (e.g., the DSRC data 195 for each of the vehicles included in the second micro-vehicular cloud) and determines that the merge solution is for the merging vehicle 630 to merge into the roadway in such a way that the merging vehicle 630 occupies the gap between the two vehicles (e.g., vehicle 631 and vehicle 634) which are part of the group, i.e., to execute a "merge to a gap" operation.

For example, the merge module 210 of the vehicle 631 includes code and routines which are operable, when executed by a processor of the vehicle 631, to cause the processor to execute one or more of the following steps: (1) map the GPS data 294 included in the DSRC data 195 for each of the vehicles included in the second micro-vehicular cloud to an electronic map or an electronic grid; (2) map information describing the sizes of each of these vehicles as well as the size of the merging vehicle 630 [this information may be included in the merge request] to the electronic map or the electronic grid; (3) determine, based on these mappings, that an area exists between the vehicle 631 and the vehicle 634 which is big enough for the merging vehicle 630 to occupy, as well as possibly other vehicles, which indicates the presence of a gap; (4) determine that the area is safely accessible by the merging vehicle 630 based on its current location, speed, acceleration and heading [all of which may be included in the merge request] as well as the current location, speed, acceleration and heading of the vehicle 631 and the vehicle 634; (5) determine the approximate GPS coordinate of the available area; (6) determine that the merge solution is for the merging vehicle 630 to "merge to a gap" and drive to the GPS coordinate of step (5); and (6) transmit, via the non-infrastructure network, a wireless message including digital data describing the merge solution to the coordinator of the micro-vehicular cloud that includes the merging vehicle 630. In some embodiments, the determination module 808 of the merge module 210 includes the code and routines that are operable, when executed by the processor, to cause the processor to execute one or more of the steps described in this paragraph.

Referring to FIG. 6H, depicted is a block diagram illustrating a merge to an open lane merge solution according to some embodiments. The dashed elliptical shaped represents the area of the roadway which the merging vehicle 630 will occupy when it merges into the lane of the roadway. As depicted, an open lane exists in front of the vehicle 631 such that the merging vehicle 630 can safely merge into the lane by merging in front of the vehicle 631.

In some embodiments, the coordinator for the second micro-vehicular cloud (e.g., vehicle 631) analyzes the local state data for the second micro-vehicular cloud (e.g., the DSRC data 195 for each of the vehicles included in the second micro-vehicular cloud) and determines that the merge solution is for the merging vehicle 630 to merge into the roadway in such a way that the merging vehicle 630 enters the roadway in front of the vehicle 631 so that the merging vehicle 630 occupies a portion of the open lane in front of the vehicle 631.

For example, the merge module 210 of the vehicle 631 includes code and routines which are operable, when executed by a processor of the vehicle 631, to cause the processor to execute one or more of the following steps: (1) map the GPS data 294 included in the DSRC data 195 for each of the vehicles included in the second micro-vehicular cloud to an electronic map or an electronic grid; (2) map information describing the sizes of each of these vehicles as well as the size of the merging vehicle 630 [this information may be included in the merge request] to the electronic map or the electronic grid; (3) determine, based on these mappings, that an open lane exists in front of the vehicle 631 which includes an area big enough for the merging vehicle 630 to occupy; (4) determine that the area is safely accessible by the merging vehicle 630 based on its current location, speed, acceleration and heading [all of which may be included in the merge request] as well as the current location, speed, acceleration and heading of the vehicle 631; (5) determine the approximate GPS coordinate of the available area; (6) determine that the merge solution is for the merging vehicle 630 to "merge to an open lane" and drive to the GPS coordinate of step (5); and (6) transmit, via the non-infrastructure network, a wireless message including digital data describing the merge solution to the coordinator of the micro-vehicular cloud that includes the merging vehicle 630. In some embodiments, the determination module 808 of the merge module 210 includes the code and routines that are operable, when executed by the processor, to cause the processor to execute one or more of the steps described in this paragraph.

Figure 7:
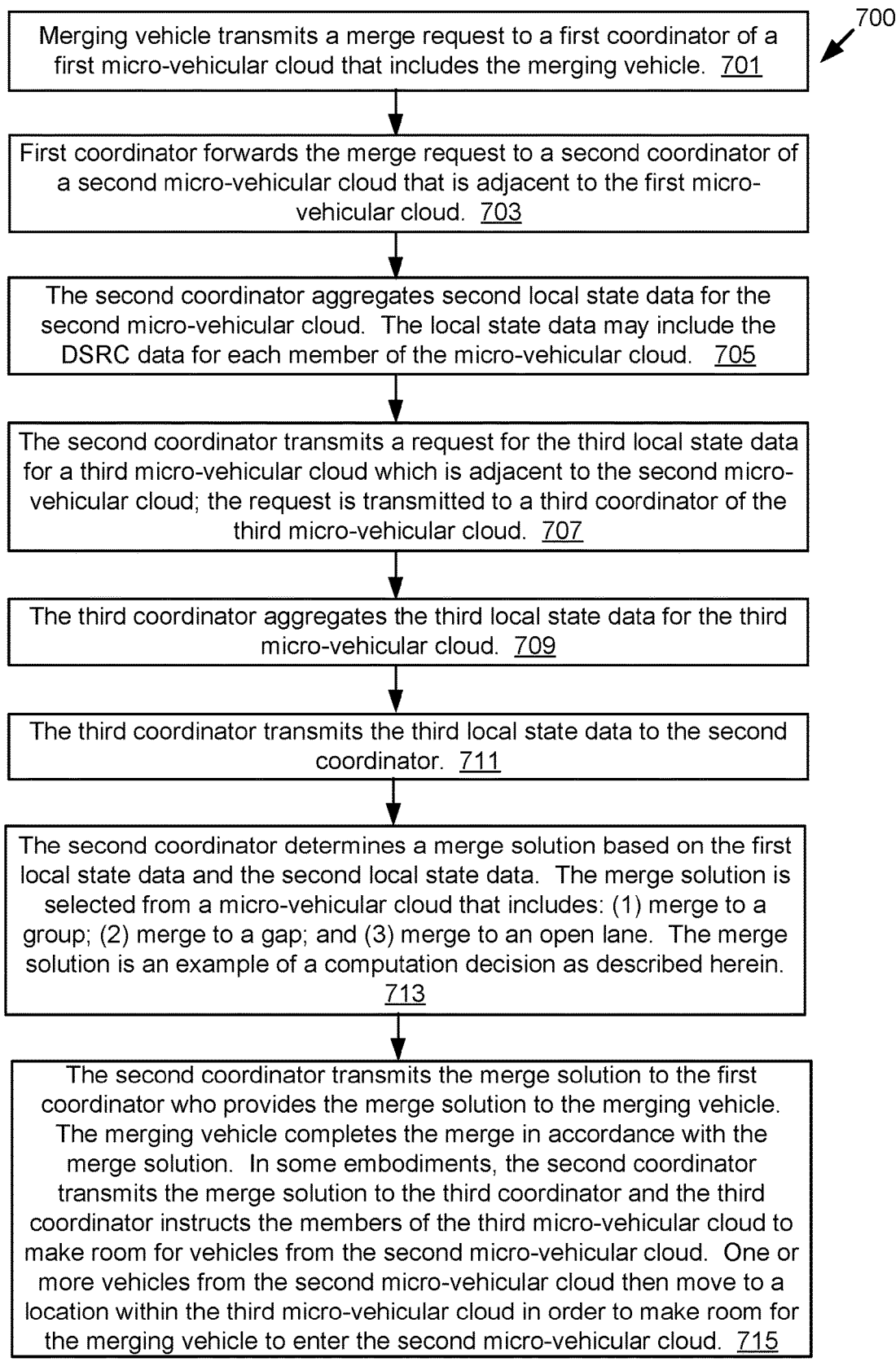
FIG. 7 is a flowchart of an example method for providing a computation service including a merge solution according to some embodiments.

Referring to FIG. 7, depicted is a flowchart of an example method 700 for providing a computation service including a merge solution according to some embodiments. In some embodiments, the computation service described below with reference to FIG. 7 is referred to herein as a "merge service." The method 700 is described with reference to FIGS. 6A-6H.

Figure 8:
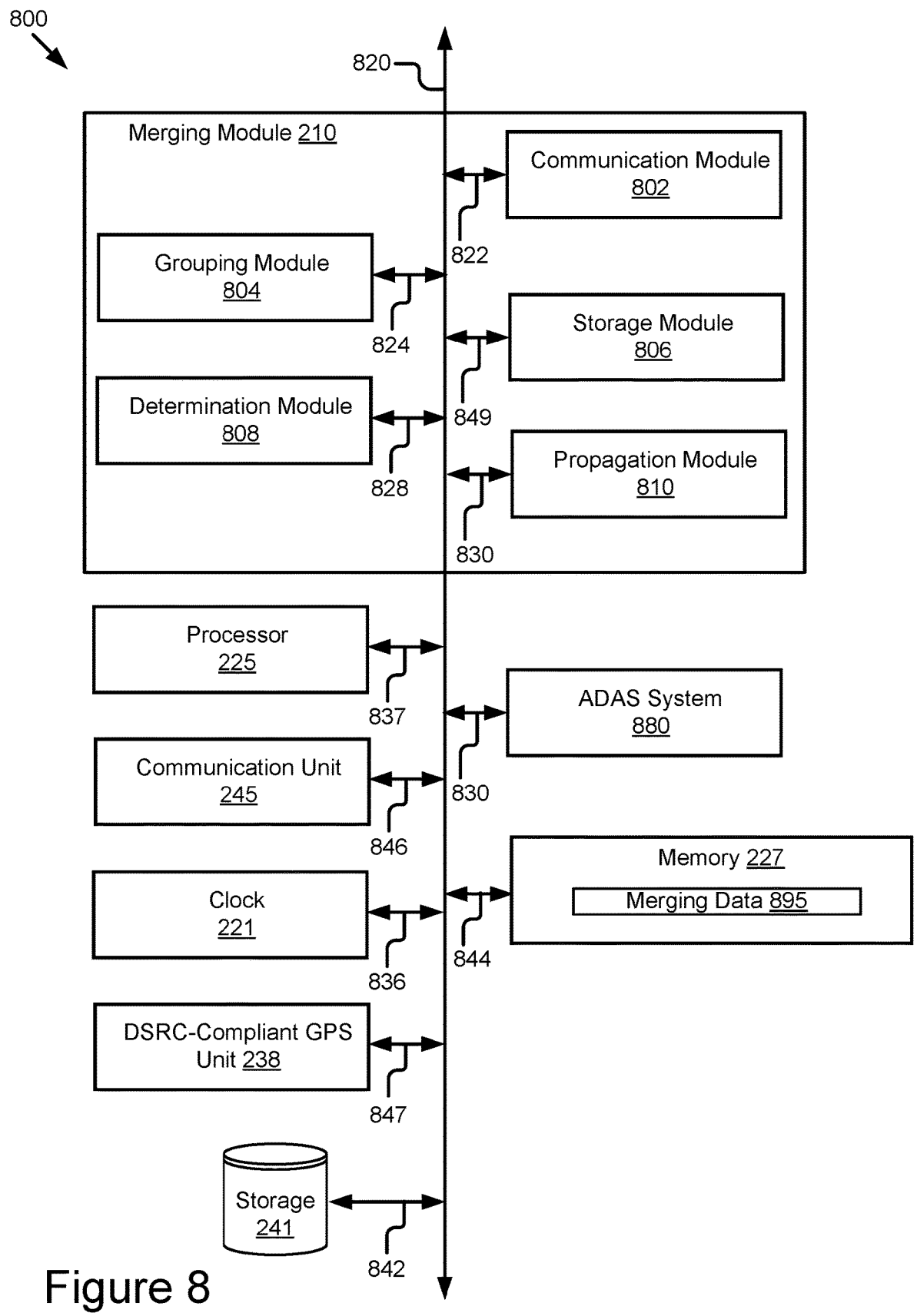
FIG. 8 is a block diagram illustrating an example computer system including a merge module according to some embodiments.

In some embodiments, the method 700 is executed by the computer system 800 depicted in FIG. 8.

At step 701, a merging vehicle transmits a merge request to a first coordinator of a first micro-vehicular cloud that includes the merging vehicle.

At step 703, the first coordinator forwards the merge request to a second coordinator of a second micro-vehicular cloud that is adjacent to the first micro-vehicular cloud.

At step 705, the second coordinator aggregates second local state data for the second micro-vehicular cloud. The second local state data may include the DSRC data for each member of the second micro-vehicular cloud. The DSRC data describes, among other things, the GPS location of each vehicle, the size of each vehicle, the speed of each vehicle, the acceleration of each vehicle and the heading of each vehicle. The DSRC data may also include a unique identifier of each vehicle so that different vehicles are differentiated from one another.

At step 707, the second coordinator transmits a request for the third local state data for a third micro-vehicular cloud which is adjacent to the second micro-vehicular cloud; the request is transmitted to a third coordinator of the third micro-vehicular cloud.

At step 709, the third coordinator aggregates the third local state data for the third micro-vehicular cloud. The third local state data may include the DSRC data for each member of the third micro-vehicular cloud. The DSRC data describes, among other things, the GPS location of each vehicle, the size of each vehicle, the speed of each vehicle, the acceleration of each vehicle and the heading of each vehicle. The DSRC data may also include a unique identifier of each vehicle so that different vehicles are differentiated from one another.

At step 711, the third coordinator transmits the third local state data to the second coordinator.

At step 713, the second coordinator determines a merge solution based on the first local state data and the second local state data. The merge solution is selected from a micro-vehicular cloud that includes: (1) merge to a group; (2) merge to a gap; and (3) merge to an open lane. The merge solution is an example of a computation service as described herein.

At step 715, the second coordinator transmits the merge solution to the first coordinator who provides the merge solution to the merging vehicle. The merging vehicle completes the merge in accordance with the merge solution. In some embodiments, the second coordinator transmits the merge solution to the third coordinator and the third coordinator instructs the members of the third micro-vehicular cloud to make room for vehicles from the second micro-vehicular cloud. One or more vehicles from the second micro-vehicular cloud then move to a location within the third micro-vehicular cloud in order to make room for the merging vehicle to enter the second micro-vehicular cloud.

Referring now to FIG. 8, depicted is a block diagram illustrating an example computer system 800 including a merge module 210 according to some embodiments.

In some embodiments, the computer system 800 may include a special-purpose computer system that is programmed to perform one or more steps of the methods 300, 400, 700, 900 described below with reference to FIGS. 3, 4, 7 and 9.

In some embodiments, the computer system 800 may include a processor-based computing device. For example, the computer system 800 may include an onboard vehicle computer system of the first vehicle 123 or the second vehicle 124; the computer system 800 may also include the non-vehicle node 103.

The computer system 800 may include one or more of the following elements according to some examples: the merge module 210; the processor 225; the communication unit 245; the clock 221; the DSRC-compliant GPS unit 238; the storage 241; the memory 227; and the ADAS system 880. The components of the computer system 200 are communicatively coupled by a bus 820. In some embodiments, the computer system 800 includes one or more of the elements of the computer system 200 described above with reference to FIG. 2.

In the illustrated embodiment, the processor 225 is communicatively coupled to the bus 220 via a signal line 837. The communication unit 245 is communicatively coupled to the bus 220 via a signal line 846. The clock 221 is communicatively coupled to the bus 220 via a signal line 836. The DSRC-compliant GPS unit 238 is communicatively coupled to the bus 220 via a signal line 847. The storage 241 is communicatively coupled to the bus 220 via a signal line 842. The memory 227 is communicatively coupled to the bus 220 via a signal line 844. The ADAS system 880 is communicatively coupled to the bus 220 via a signal line 830.

The following elements of the computer system 800 were described above with reference to FIG. 2, and these descriptions will not be repeated here: the processor 225; the communication unit 245; the clock 221; the DSRC-compliant GPS unit 238; the storage 241; and the memory 227.

The ADAS system 880 includes one or more of the following types of ADAS systems: an adaptive cruise control ("ACC") system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system.

In some embodiments, the ADAS system 880 includes any software or hardware included in the vehicle that makes that vehicle be an autonomous vehicle or a semi-autonomous vehicle.

In some embodiments, the computer system 200 includes set of ADAS systems 880. The set may include a plurality of ADAS systems 880.

The National Highway Traffic Safety Administration ("NHTSA") has defined different "levels" of autonomous vehicles, e.g., Level 0, Level 1, Level 2, Level 3, Level 4 and Level 5. If an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. The different levels of autonomous vehicles are described briefly below.

Level 0: The set of ADAS systems 880 have no vehicle control, but may issue warnings to the driver of the vehicle. A vehicle which is Level 0 is not an autonomous or semi-autonomous vehicle.

Level 1: The driver must be ready to take driving control of the autonomous vehicle at any time. The set of ADAS systems 880 may provide autonomous features such as one or more of the following: ACC; and Parking Assistance with automated steering and Lane Keeping Assistance ("LKA") Type II, in any combination.

Level 2: The driver is obliged to detect objects and events in the roadway environment and respond if the set of ADAS systems 880 fail to respond properly (based on the driver's subjective judgement). The set of ADAS systems 880 installed in the autonomous vehicle executes accelerating, braking, and steering. The set of ADAS systems 880 can deactivate immediately upon takeover by the driver.

Level 3: Within known, limited environments (such as freeways), the driver can safely turn their attention away from driving tasks, but must still be prepared to take control of the autonomous vehicle when needed.

Level 4: The set of ADAS systems 880 can control the autonomous vehicle in all but a few environments such as severe weather. The driver must enable the automated system (which is comprised of the set of ADAS systems 880) only when it is safe to do so. When the automated system is enabled, driver attention is not required for the autonomous vehicle to operate safely and consistent with accepted norms.

Level 5: Other than setting the destination and starting the system, no human intervention is required. The automated system can drive to any location where it is legal to drive and make its own decision (which may vary based on the jurisdiction where the vehicle is located).

A highly autonomous vehicle ("HAV") is an autonomous vehicle that is Level 3 or higher.

Accordingly, in some embodiments the computer system 800 is an element of one of the following: a Level 1 autonomous vehicle; a Level 2 autonomous vehicle; a Level 3 autonomous vehicle; a Level 4 autonomous vehicle; a Level 5 autonomous vehicle; and an HAV.

The memory 227 stores the merging data 895 and, optionally, any of the data depicted in FIG. 2 or described herein. In some embodiments, the memory 227 stores any data necessary for the merge module 210 to provide its functionality. The merging data 895 is digital data that describes one or more of the following: the wireless messages described above with reference to FIG. 7 and method 700; the electronic map or electronic grid described above with reference to FIGS. 6F-6H and 7; the DSRC data 195 and/or local state data; digital data describing the decisions of the ADAS system 880; any digital data described below with reference to the grouping module 804, the storage module 806, the determination module 808 and the propagation module 810.

In the illustrated embodiment shown in FIG. 8, the merge module 210 includes a communication module 802, a grouping module 804, a storage module 806, a determination module 808 and a propagation module 810. These components of the merge module 210 are communicatively coupled to each other via the bus 820. In some embodiments, one or more of these elements of the merge module 210 can be replaced by one or more elements of the computer system 200 described above with reference to FIG. 2. In some embodiments, one or more of these elements of the computer system 200 can be replaced by one or more elements of the merge module 210.

The communication module 802 includes functionality similar to the communication module 202 described above with reference to FIG. 2, and so, this description will not be repeated here. In some embodiments, the communication module 802 can be stored in the memory 227 of the computer system 800 and can be accessible and executable by the processor 225. The communication module 802 may be adapted for cooperation and communication with the processor 225 and other components of the computer system 800 via signal line 822.

The grouping module 804 can be software including routines for exchanging wireless messages among other vehicles (e.g., the other vehicles of the operating environment 698 of FIG. 6A) in order to establish the micro-vehicular clouds, track which vehicles are members of which micro-vehicular clouds, elect a coordinator for each micro-vehicular cloud and route wireless messages internally among the members of a micro-vehicular cloud and externally among the coordinators of the different micro-vehicular clouds.

In some embodiments, the grouping module 804 includes code and routines that assigns membership in a micro-vehicular cloud based on the geographic location of each vehicle. For example, in some embodiments, there are predefined geographic regions which each include a micro-vehicular cloud, and vehicles are assigned membership in a particular micro-vehicular cloud based on their geographic location. In some embodiments, the different vehicles of a geographic region broadcast or unicast wireless messages including digital data describing their unique vehicle identifier and geographic location (e.g., a DSRC message includes both of these types of digital data) and the membership in the different micro-vehicular clouds is determined by each recipient of these messages based on the digital data they contain.

In some embodiments, the coordinator for a micro-vehicular cloud and the routing for messages is selected at random or based on some predetermined arrangement. For example, the grouping module 804 provides its functionality using the lookup table 156 depicted in FIG. 1G. In some embodiments, the lookup table 156 is stored in the memory 127 of the computer system 800.

In some embodiments, the maximum number of vehicles allowed in a single micro-vehicular cloud is 20 vehicles.

In some embodiments, the grouping module 804 includes code and routines that, when executed by the processor 225, cause the processor 225 to aggregate the DSRC data 195 received from other vehicles as the local state data. This process may be repeated on a regular basis (e.g., once every tenth of a second) using BSMs as a source for DSRC data 195. The grouping module 804 may analyze the vehicle identifiers for each received instance of DSRC data 195 to ensure that the vehicle is a member of the micro-vehicular cloud to which computer system 800 belongs so that irrelevant data is not included in the local state data for each micro-vehicular cloud. The grouping module 804 may also respond to requests for the local state data by causing the communication module 802 and the communication unit 145 to provide the local state data to any coordinator which requests the local state data.

The merge module 210 includes a grouping module 804 which includes code and routines that are operable to cause each vehicle which includes a provision system 199 to broadcast or unicast a "grouping message" to each of the other vehicles that are within range of the non-infrastructure network 105 (e.g., 1000 meters if DSRC is used). In some embodiments, the grouping message includes digital data that describes one or more of the following types of information: (1) a vehicle identifier that uniquely identities the vehicle which transmits the grouping message; and (2) GPS data describing the location of the vehicle which transmits the grouping message [optionally, the GPS data describes the location of the vehicle with lane-level accuracy].

In some embodiments, the grouping module 804 can be stored in the memory 227 of the computer system 800 and can be accessible and executable by the processor 225. The grouping module 804 may be adapted for cooperation and communication with the processor 225 and other components of the computer system 800 via signal line 824.

The storage module 806 can be software including routines for reading data from the memory 227 or writing data to the memory 227. In some embodiments, each micro-vehicular cloud is responsible for maintaining historical data for a predetermined amount of time (e.g., the past 5 seconds or some other time interval). For example, selected instances of data have (1) a label indicating that it should be stored as historical data on the memory 227 and (2) a time stamp. When a new vehicle joins the micro-vehicular cloud, these selected instances of data are forwarded to the new member and stored in the memories (e.g., memory 227) of these vehicles so long as their retention period (e.g., 5 seconds) has not elapsed as indicated by their time stamp. In some embodiments, some data may be permanently stored. For example, data such as the geographic regions which define different micro-vehicular clouds may be permanently stored if possible to do so (e.g., by the presence of a RSU in the geographic area).

In some embodiments, data may also be stored by the storage module 806 as described above with reference to the storage module 208 of FIG. 2.

In some embodiments, the storage module 806 can be stored in the memory 227 of the computer system 800 and can be accessible and executable by the processor 225. The storage module 806 may be adapted for cooperation and communication with the processor 225 and other components of the computer system 200 via signal line 849.

The determination module 808 can be software including routines for determining merge solutions as described above with reference to FIGS. 6A-6H and 7.

In some embodiments, the determination module 808 includes code and routines that are operable to execute one or more of the steps of the method 900 described below with reference to FIG. 9 for determining whether a computation service is provided by a single micro-vehicular cloud or multiple micro-vehicular clouds.

In some embodiments, the determination module 808 can be stored in the memory 227 of the computer system 800 and can be accessible and executable by the processor 225. The determination module 808 may be adapted for cooperation and communication with the processor 225 and other components of the computer system 800 via signal line 828.

The propagation module 810 can be software including routines for causing the communication module 202 and the communication unit 245 to transmit messages to other vehicles including determinations made by the determination module 808. For example, the propagation module 810 causes the communication module 202 to forward a merge solution to a merging vehicle which originated a merge request.

Figure 9:
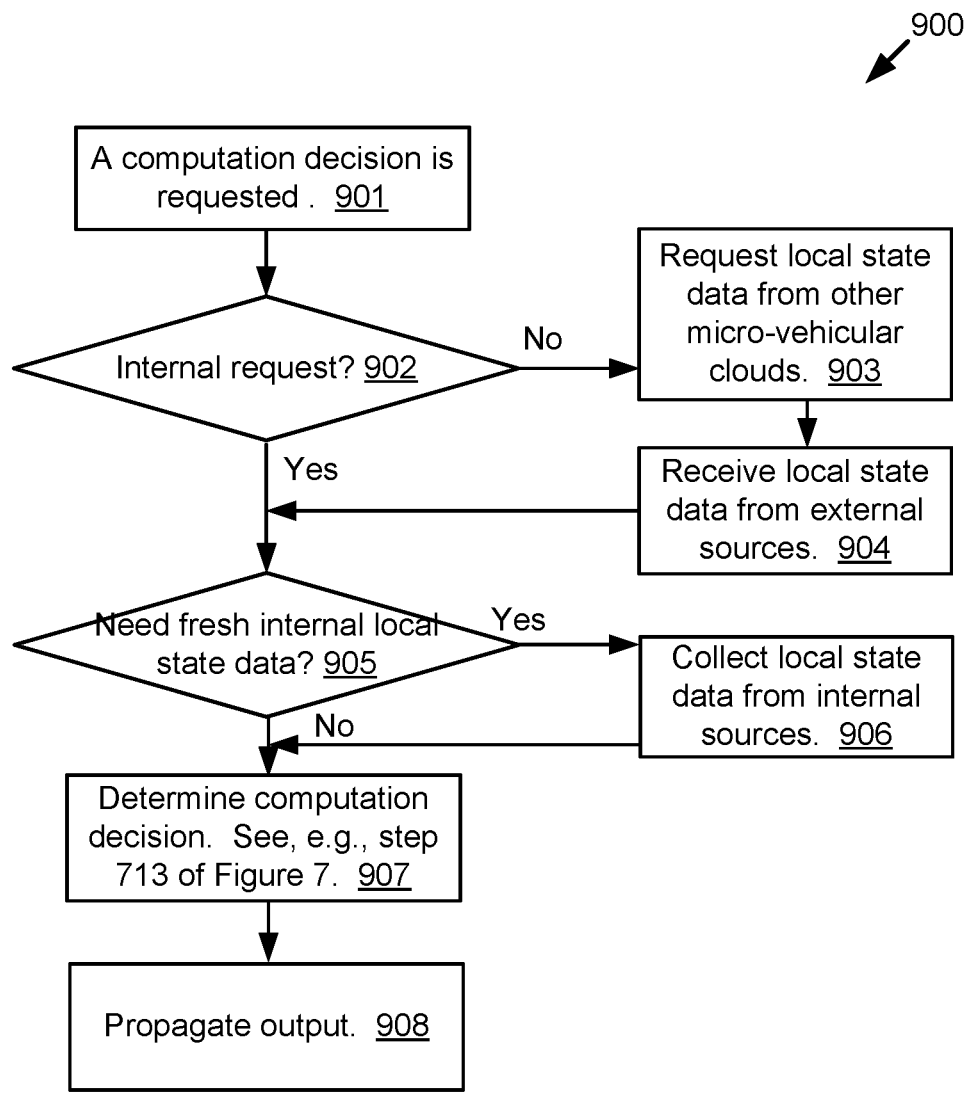
FIG. 9 is a flowchart of an example method for providing a computation service according to some embodiments.

Referring to FIG. 9, depicted is a flowchart of an example method 900 for providing a computation service according to some embodiments.

In some embodiments, the method 900 is executed by the computer system 800 depicted in FIG. 8 or the computer system 200 of FIG. 2.

At step 901, a computation service is requested. For example, a vehicle may request a computation service by providing a merge request.

At step 902, a determination is made regarding whether the request of step 901 was received from an internal source or an external source relative to the micro-vehicular cloud which is executing the method 900. If the determination is that the source is external, then the method 900 proceeds to step 903. If the determination is made that the source is internal, then the method 900 proceeds to step 905.

At step 903, a request for local state data is transmitted to one or more other micro-vehicular clouds.

At step 904, the local state data from the external sources is received. The method 900 then proceeds to step 905.

At step 905, a determination is made regarding whether fresh internal local state data is needed. For example, this determination refers to whether a threshold of time has expired since a coordinator for the micro-vehicular cloud which is executing the method 900 has expired such that new, or "fresh," local state data is collected. If the determination is that fresh internal local state data is needed, then the method 900 proceeds to step 906. If the determination is that fresh internal local state data is not needed, then the method 900 proceeds to step 907.

At step 906, local state data is collected from internal sources. For example, DSRC messages are received and their DSRC data is extracted. The method 900 then proceeds to step 907.

At step 907, a computation service is made based at least in part on the internal local state data and, if applicable, the external local state data.

At step 908, the computation service is propagated at needed.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A system comprising:
a vehicle communicatively coupled to a macro-vehicular cloud via a non-infrastructure network;
wherein the macro-vehicular cloud includes a plurality of micro-vehicular clouds;
wherein each of the micro-vehicular clouds is formed from a set of mobile nodes including the vehicle, one or more other vehicles, and a coordinator and wherein the set of mobile nodes include a set of provision systems which are operable to provide a set of computing resources to the macro-vehicular cloud via the non-infrastructure network;
wherein the set of computing resources are selected by the set of provision systems from those that are unused by the set of mobile nodes and therefore available;
wherein the vehicle is a member of a selected micro-vehicular cloud included in the plurality of micro-vehicular clouds so that the vehicle is an element of the macro-vehicular cloud; and
wherein the vehicle is operable to request a merge service from the set of computing resources of the macro-vehicular cloud via the non-infrastructure network, the coordinator accesses the computing resources of the macro-vehicular cloud via the non-infrastructure network, the vehicle receives the merge service from the coordinator of the selected micro-vehicular cloud, and the merge service instructs the vehicle to merge into a lane of a roadway.

2. The system of claim 1, wherein the merge service includes specifying a latitude and longitude where the vehicle should merge into the lane of the roadway.

3. The system of claim 1, wherein the non-infrastructure network includes a Dedicated Short Range Communication (DSRC) network which sends and receives messages over a 5.9 gigahertz (GHz) DSRC band and the merge service is requested via a DSRC message.

4. The system of claim 1, wherein the non-infrastructure network includes a millimeter wave communication network and the merge service is requested via a millimeter wave communication message.

5. The system of claim 1, wherein the non-infrastructure network includes a full-duplex wireless communication network and the merge service is requested via a full-duplex wireless communication message.

6. The system of claim 1:
wherein each individual micro-vehicular cloud of the plurality of micro-vehicular clouds includes the one or more other vehicles and the coordinator;
wherein the one or more other vehicles and the coordinator are communicatively coupled to the non-infrastructure network;
wherein the coordinator of each individual micro-vehicular cloud is communicatively coupled to the macro-vehicular cloud via the non-infrastructure network; and
wherein the coordinator is operable to determine which mobile node in the set of mobile nodes stores which data.

7. The system of claim 1, wherein the one or more other vehicles are at least momentarily dynamic while the plurality of micro-vehicular clouds are each located at a fixed geographical region which is static and different from the fixed geographical region of the other micro-vehicular clouds included in the plurality of micro-vehicular clouds.

8. The system of claim 1, wherein the set of provision systems are each elements of the one or more other vehicles of the plurality of micro-vehicular clouds.

9. A method implemented by a vehicle communicatively coupled to a macro-vehicular cloud via a non-infrastructure network, wherein the macro-vehicular cloud includes a plurality of micro-vehicular clouds, each of the micro-vehicular clouds is formed from a set of mobile nodes including the vehicle, one or more other vehicles, and a coordinator, wherein the set of mobile nodes include a set of provision systems that are operable to provide a set of computing resources to the macro-vehicular cloud via the non-infrastructure network, wherein the set of computing resources are selected by the set of provision systems from those that are unused by the set of mobile nodes and therefore available, and wherein the vehicle is a member of a selected micro-vehicular cloud included in the plurality of micro-vehicular clouds so that the vehicle is an element of the macro-vehicular cloud, the method comprising:
transmitting, via the non-infrastructure network, a wireless message requesting a merge service from the macro-vehicular cloud, wherein the coordinator accesses the computing resources of the macro-vehicular cloud via the non-infrastructure network; and
receiving, via the non-infrastructure network, the merge service from the coordinator of the selected micro-vehicular cloud, wherein the merge service instructs the vehicle to merge into a lane of a roadway.

10. The method of claim 9, wherein the merge service includes specifying a latitude and longitude where the vehicle should merge into the lane of the roadway.

11. The method of claim 9, wherein the non-infrastructure network includes a Dedicated Short Range Communication (DSRC) network which sends and receives messages over a 5.9 gigahertz (GHz) DSRC band and the merge service is requested via a DSRC message.

12. The method of claim 9, wherein the non-infrastructure network includes a millimeter wave communication network and the merge service is requested via a millimeter wave communication message.

13. The method of claim 9, wherein the non-infrastructure network includes a full-duplex wireless communication network and the merge service is requested via a full-duplex wireless communication message.

14. The method of claim 9, wherein the coordinator is operable to determine which mobile node in the set of mobile nodes stores which data.

15. A computer program product comprising a non-transitory memory of an onboard vehicle computer system of a vehicle communicatively coupled to a macro-vehicular cloud via a non-infrastructure network, wherein the macro-vehicular cloud includes a plurality of micro-vehicular clouds, each of the micro-vehicular clouds is formed from a set of mobile nodes including the vehicle, one or more other vehicles, and a coordinator, wherein the set of mobile nodes include a set of provision systems that are operable to provide a set of computing resources to the macro-vehicular cloud via the non-infrastructure network, wherein the set of computing resources are selected by the set of provision systems from those that are unused by the set of mobile nodes and therefore available, wherein the vehicle is a member of a selected micro-vehicular cloud included in the plurality of micro-vehicular clouds so that the vehicle is an element of the macro-vehicular cloud, and wherein the onboard vehicle computer system stores computer-executable code that, when executed by the onboard vehicle computer system, causes the onboard vehicle computer system to:

transmit, via the non-infrastructure network, a wireless message requesting a merge service from the macro-vehicular cloud, wherein the coordinator accesses the computing resources of the macro-vehicular cloud via the non-infrastructure network; and receive, via the non-infrastructure network, the merge service from the coordinator of the selected micro-vehicular, wherein the merge service instructs the vehicle to merge into a lane of a roadway.

16. The computer program product of claim 15, wherein the merge service includes specifying a latitude and longitude where the vehicle should merge into the lane of the roadway and the latitude and longitude are specified with lane-level accuracy.

17. The computer program product of claim 16, wherein the coordinator is operable to determine which mobile node in the set of mobile nodes stores which data.

18. The computer program product of claim 16, the set of provisioning systems are each elements of the one or more other vehicles of the plurality of micro-vehicular clouds.

19. The computer program product of claim 16, wherein the coordinator is operable to control an operation of the set of provisioning systems of the one or more other vehicles included in an individual micro-vehicular cloud which includes the coordinator.

20. The computer program product of claim 16, wherein the non-infrastructure network includes a Dedicated Short Range Communication (DSRC) network which sends and receives messages over a 5.9 gigahertz (GHz) DSRC band and the merge service is requested via a DSRC message.

* * * * *